(12) United States Patent
Shuto et al.

(10) Patent No.: US 10,961,067 B2
(45) Date of Patent: Mar. 30, 2021

(54) MEDIUM FEEDING APPARATUS AND IMAGE READING APPARATUS

(71) Applicant: SEIKO EPSON CORPORATION, Tokyo (JP)

(72) Inventors: Ryoichi Shuto, Kitakyushu (JP); Tsuyoshi Yamanaka, Kitakyushu (JP); Kazuya Yoshikaie, Kitakyushu (JP); Shinsuke Kogi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/231,638

(22) Filed: Dec. 24, 2018

(65) Prior Publication Data
US 2019/0193967 A1   Jun. 27, 2019

(30) Foreign Application Priority Data

Dec. 26, 2017   (JP) .............................. JP2017-248839
Sep. 27, 2018   (JP) .............................. JP2018-181433

(51) Int. Cl.
B65H 3/06   (2006.01)
H04N 1/00   (2006.01)
B65H 3/54   (2006.01)

(52) U.S. Cl.
CPC ............ B65H 3/0669 (2013.01); B65H 3/54 (2013.01); H04N 1/00602 (2013.01);
(Continued)

(58) Field of Classification Search
CPC .. B65H 3/54; B65H 3/0669; B65H 2403/732; H04N 1/00602; H04N 1/00628
See application file for complete search history.

(56) References Cited

U.S. PATENT DOCUMENTS 6,672,579 B2 *  1/2004  Araki .................. B65H 3/0669
                                                                271/121
8,353,508 B2 *  1/2013  Nishikata ................. B65H 1/12
                                                                271/147
(Continued)

FOREIGN PATENT DOCUMENTS

JP   2001-199582 A   7/2001
JP   2001-213539 A   8/2001
(Continued)

OTHER PUBLICATIONS

The Extended European Search Report for the corresponding European Patent Application No. 18215841.0 dated Apr. 26, 2019.

*Primary Examiner* — Patrick Cicchino
(74) *Attorney, Agent, or Firm* — Global IP Counselors, LLP

(57) ABSTRACT

A medium feeding apparatus includes a feeding roller, a separation roller which nips a medium between the separation roller and the feeding roller to separate the medium and to which a driving torque is applied by a driving source in a second rotation direction that is opposite to a first rotation direction in which the medium is fed to a downstream side, and a torque limiter that causes the separation roller to idle in the first rotation direction when a rotational torque applied to the separation roller in the first rotation direction exceeds a limit torque that is a predetermined upper torque limit, in which separation setting including a pressing load of the separation roller, a rotational speed of the separation roller, and the limit torque is changeable according to condition of feeding.

19 Claims, 17 Drawing Sheets

(52) U.S. Cl.
CPC ..... *H04N 1/00628* (2013.01); *H04N 1/00649* (2013.01); *B65H 2403/40* (2013.01); *B65H 2403/732* (2013.01)

(56) References Cited

U.S. PATENT DOCUMENTS

| | | | |
|---|---|---|---|
| 8,678,372 B2 * | 3/2014 | Yasukawa | B65H 7/12 271/10.09 |
| 2001/0020765 A1 * | 9/2001 | Araki | B65H 3/0669 271/125 |
| 2002/0001105 A1 | 1/2002 | Takaki et al. | |
| 2012/0153558 A1 * | 6/2012 | Takahashi | B65H 3/5261 271/10.09 |
| 2013/0241145 A1 * | 9/2013 | Yasukawa | B65H 7/12 271/272 |

FOREIGN PATENT DOCUMENTS

| | | | |
|---|---|---|---|
| JP | 2001-213540 A | 8/2001 | |
| JP | 2012-18827 9 A | 10/2012 | |

* cited by examiner

FIG. 14
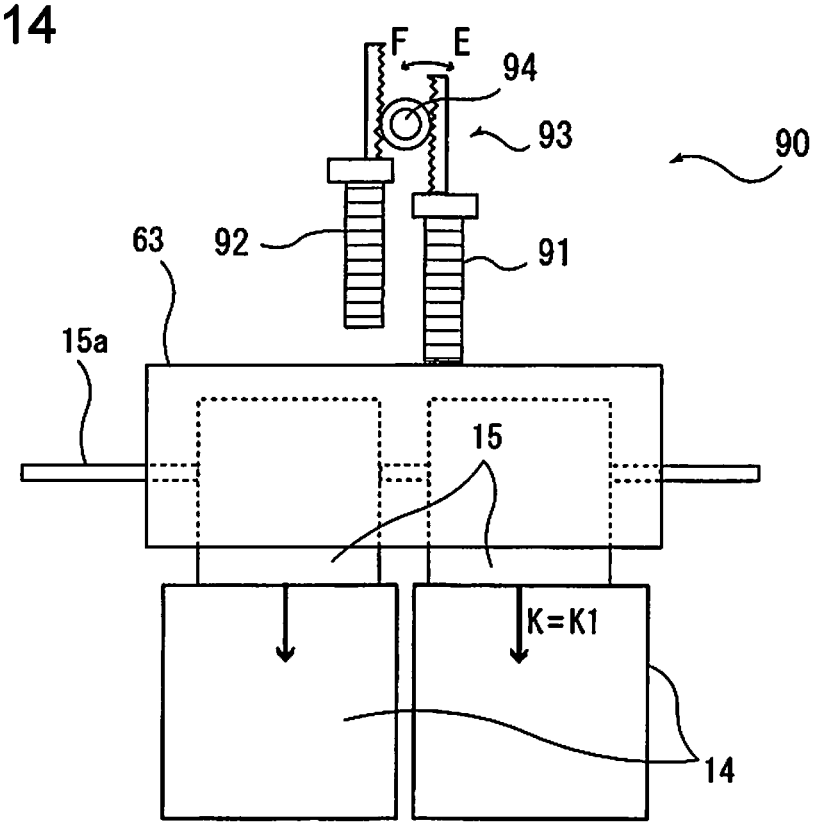
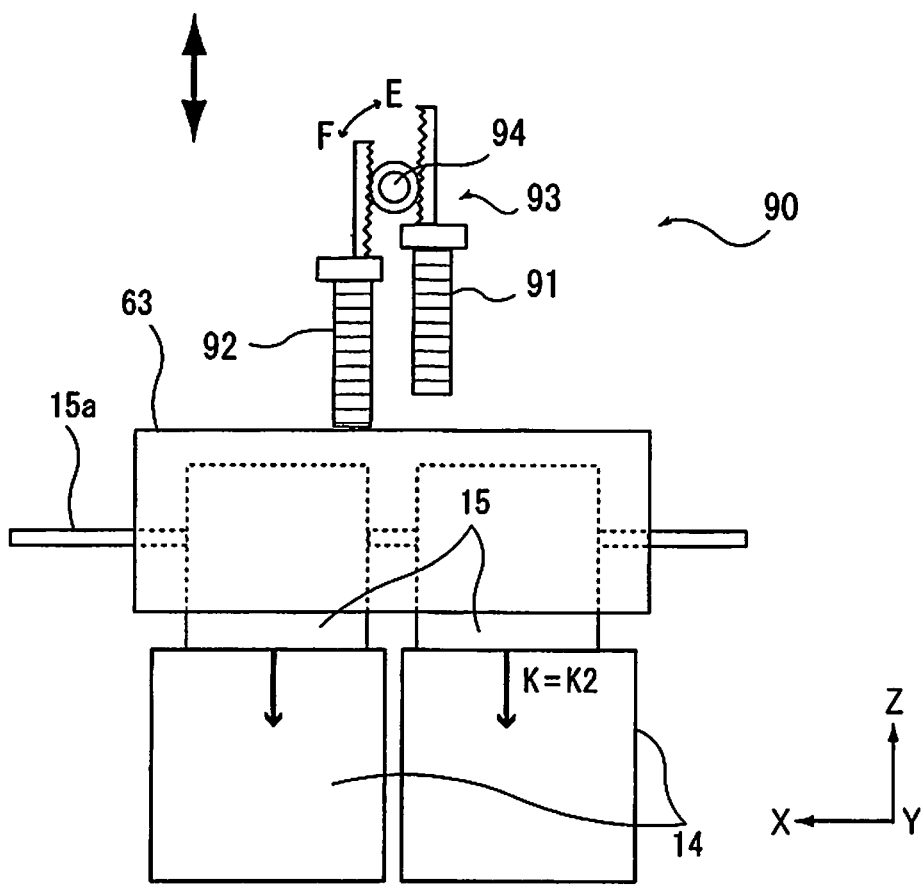

MEDIUM FEEDING APPARATUS AND IMAGE READING APPARATUS

BACKGROUND

1. Technical Field

The present invention relates to a medium feeding apparatus that feeds a manuscript, and an image reading apparatus that reads the manuscript fed by the medium feeding apparatus.

2. Related Art

A medium feeding apparatus (referred to as an auto document feeder (ADF)) that automatically feeds a medium as a manuscript is provided in a scanner as an example of an image reading apparatus, and automatically feeds and reads a plurality of media.

Thus, the medium feeding apparatus includes a medium tray on which a plurality of media are placed on a placement surface thereof, a feeding roller that rotates to feed the medium while being in contact with a surface of the medium set in the medium tray, and a separation roller that separates the medium while being in contact with the feeding roller.

By the way, there are various kinds of media. For example, when a separating force caused by the separation roller is applied to a medium such as thin paper and waste paper having low rigidity, there is a concern in that the medium is greatly damaged.

Therefore, the medium feeding apparatus has been proposed which can select a separation mode in which the separation is performed by the separation roller and a non-separation mode in which the medium is fed without being separated by the separation roller according to the type of the medium (for example, JP-A-2012-188279).

Here, in the medium feeding apparatus according to the related art, although whether or not the selection is performed by the separation roller according to the selection of the separation mode and the non-separation mode, separation resistance of the medium is uniformly set in the separation mode. Therefore, even when the separation mode is selected, the separation may not be properly performed according to the type of the medium.

SUMMARY

An advantage of some aspects of the invention is to provide a medium feeding apparatus that can more appropriately separate a medium and an image reading apparatus including the medium feeding apparatus.

According to an aspect of the invention, there is provided a medium feeding apparatus including: a medium placing unit on which a medium is placed; a feeding roller that feeds the medium from the medium placing unit; a separation roller which nips the medium between the separation roller and the feeding roller to separate the medium and to which a driving torque is applied by a driving source in a second rotation direction that is opposite to a first rotation direction in which the medium is fed to a downstream side; and a torque limiter that causes the separation roller to idle in the first rotation direction when a rotational torque applied to the separation roller in the first rotation direction exceeds a limit torque that is a predetermined upper torque limit, in which the medium feeding apparatus has a load changing unit that changes a pressing load of the separation roller against the feeding roller, a speed changing unit that changes a rotational speed of the driving source, and a torque changing unit that changes the limit torque, and separation setting including the pressing load, the rotational speed, and the limit torque is changeable according to conditions during feeding.

BRIEF DESCRIPTION OF THE DRAWINGS

The invention will be described with reference to the accompanying drawings, wherein like numbers reference like elements.

FIG. 14 is a schematic view illustrating modification example 1 of the load changing unit.

DESCRIPTION OF EXEMPLARY EMBODIMENTS

Figure 1:
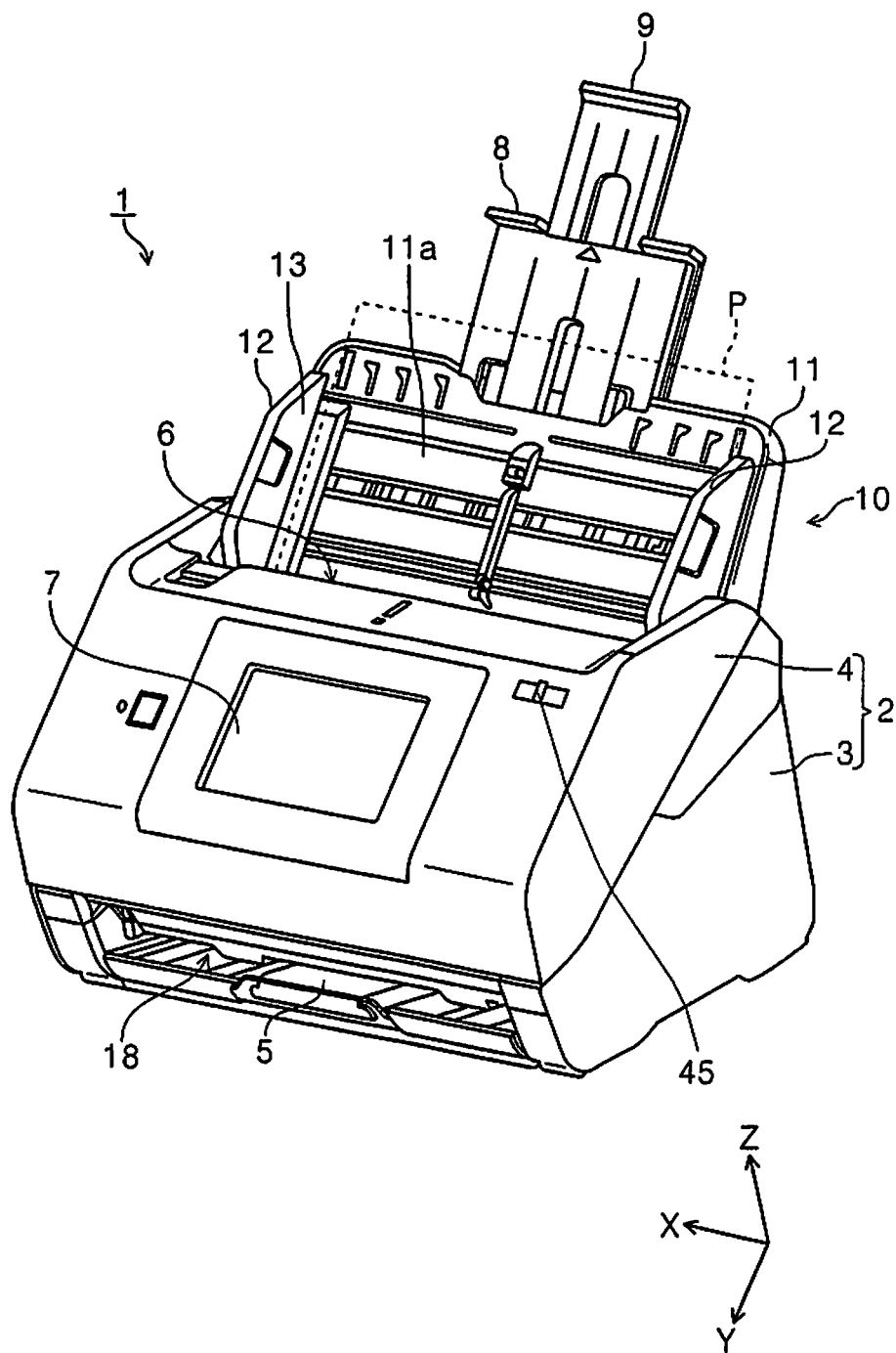
FIG. 1 is a perspective view illustrating an outer appearance of a scanner according to the invention.

Hereinafter, the invention will be schematically described.

A medium feeding apparatus according to a first aspect of the invention includes: a medium placing unit on which a medium is placed; a feeding roller that feeds the medium from the medium placing unit; a separation roller which nips the medium between the separation roller and the feeding roller to separate the medium and to which a driving torque is applied by a driving source in a second rotation direction that is opposite to a first rotation direction in which the medium is fed to a downstream side; a torque limiter that causes the separation roller to idle in the first rotation direction when a rotational torque applied to the separation roller in the first rotation direction exceeds a limit torque that is a predetermined upper torque limit; a load changing unit that changes a pressing load of the separation roller against the feeding roller; a speed changing unit that changes a rotational speed of the driving source; and a torque changing unit that changes the limit torque, in which separation setting including the pressing load, the rotational speed, and the limit torque is changeable according to conditions during feeding.

According to the present aspect, since the separation setting including the pressing load, the rotational speed, and the limit torque is changeable according to the conditions during the feeding, the medium can be separated more appropriately.

Further, the "conditions during the feeding" mean at least one of all the conditions affecting separability, such as the type of the medium and the number of media, or a combination of the plurality thereof.

A medium feeding apparatus according to a second aspect of the invention includes: a medium placing unit on which a medium is placed; a feeding roller that feeds the medium from the medium placing unit; a separation roller which nips the medium between the separation roller and the feeding roller to separate the medium and to which a driving torque is applied by a driving source in a second rotation direction that is opposite to a first rotation direction in which the medium is fed to a downstream side; a torque limiter that causes the separation roller to idle in the first rotation direction when a rotational torque applied to the separation roller in the first rotation direction exceeds a limit torque that is a predetermined upper torque limit; a torque changing unit that changes the limit torque; and a load changing unit that changes a pressing load of the separation roller against the feeding roller, in which separation setting including the pressing load and the limit torque is changeable according to conditions during feeding.

According to the present aspect, since the separation setting including the pressing load and the limit torque is changeable according to the conditions during the feeding, the medium can be separated more appropriately.

Further, the "conditions during the feeding" mean at least one of all the conditions affecting separability, such as the type of the medium and the number of media, or a combination of the plurality thereof.

A medium feeding apparatus according to a third aspect of the invention includes: a medium placing unit on which a medium is placed; a feeding roller that feeds the medium from the medium placing unit; a separation roller which nips the medium between the separation roller and the feeding roller to separate the medium and to which a driving torque is applied by a driving source in a second rotation direction that is opposite to a first rotation direction in which the medium is fed to a downstream side; a torque limiter that causes the separation roller to idle in the first rotation direction when a rotational torque applied to the separation roller in the first rotation direction exceeds a limit torque that is a predetermined upper torque limit; a torque changing unit that changes the limit torque; and a speed changing unit that changes a rotational speed of the driving source, in which separation setting including the rotational speed and the limit torque is changeable according to conditions during feeding.

According to the present aspect, since the separation setting including the rotational speed and the limit torque is changeable according to the conditions during the feeding, the medium can be separated more appropriately.

Further, the "conditions during the feeding" mean at least one of all the conditions affecting separability, such as the type of the medium and the number of media, or a combination of the plurality thereof.

According to a fourth aspect of the invention, in the first or second aspect, the load changing unit may have a first pressing unit and a second pressing unit having a pressing force that is different from a pressing force of the first pressing unit, and a pressing unit that presses the separation roller against the feeding roller may be switched between the first pressing unit and the second pressing unit to change the pressing load of the separation roller against the feeding roller.

According to the present aspect, a pressing force of the separation roller against the feeding roller can be changed using the load changing unit having the first pressing unit and the second pressing unit having a pressing force that is different from a pressing force of the first pressing unit, in which the pressing unit that presses the separation roller against the feeding roller may be switched between the first pressing unit and the second pressing unit to change the pressing load of the separation roller against the feeding roller.

According to a fifth aspect of the invention, in the first aspect or the second aspect, the load changing unit includes a pressing spring that is disposed between a spring support and the separation roller to press the separation roller against the feeding roller, and changes a spring length of the pressing spring by moving the spring support to change the pressing load of the separation roller against the feeding roller.

According to the present embodiment, the pressing load of the separation roller against the feeding roller can be changed by the load changing unit that is disposed between a spring support and the separation roller, includes a pressing spring that presses the separation roller against the feeding roller, changes a spring length of the pressing spring by moving the spring support, and changes the pressing force of the separation roller against the feeding roller.

According to a sixth aspect of the invention, in the first aspect or the second aspect, the medium feeding apparatus further includes a roller holding unit that holds the separation roller in a rotatable state and has a swinging shaft that swings the held separation roller to come into contact with or be separated from the feeding roller, and a pressing unit that presses the separation roller against the feeding roller through the roller holding unit, and the load changing unit may change the pressing load of the separation roller against the feeding roller by moving a position of the swinging shaft.

According to the present embodiment, the pressing load of the separation roller against the feeding roller can be changed by the load changing unit that changes the pressing load of the separation roller against the feeding roller by moving a position of the swinging shaft of the roller holding unit.

According to a seventh aspect of the invention, in the first aspect or the second aspect, the medium feeding apparatus further includes a roller holding unit that holds the separation roller in a rotatable state and has a swinging shaft that swings the held separation roller to come into contact with or be separated from the feeding roller, and a pressing unit that presses the separation roller against the feeding roller through the roller holding unit, in which the load changing unit includes a displacement member that is in contact with the roller holding unit to regulate a position of the separation roller with respect to the feeding roller against a pressing force of the pressing unit and is displaceable in a direction in which the position of the separation roller with respect to the feeding roller is changed.

According to the present embodiment, since the pressing load of the separation roller against the feeding roller is changed by regulating a position of the separation roller with respect to the feeding roller, the pressing load of the separation roller against the feeding roller can be easily changed.

According to an eighth aspect of the invention, in the first aspect or the second aspect, the medium feeding apparatus further includes a power transmission mechanism that transmits power from the driving source that drives the separation roller, in which the power transmission mechanism includes a first gear provided integrally with a rotary shaft of the separation roller, a second gear provided integrally with the rotary shaft of the separation roller and having a reduction ratio that is different from a reduction ratio of the first gear, and a switching gear displaceable between a first position where the power of the driving source is transmitted to the first gear and a second position where the power of the driving source is transmitted to the second gear, and the load changing unit switches the switching gear between the first position and the second position to change the pressing load of the separation roller against the feeding roller.

According to the present aspect, as the switching gear of the power transmission mechanism is switched between the first position and the second position, the pressing load of the separation roller against the feeding roller can be changed by the load changing unit that changes the pressing load of the separation roller against the feeding roller.

According to a ninth aspect of the invention, in the first aspect to the eighth aspect, the torque limiter includes a first torque limiter and a second torque limiter having an idle torque that is different from an idle torque of the first torque limiter, and the torque changing unit includes a switching unit that performs switching between a state in which the rotational torque is applied to the first torque limiter and a state in which the rotational torque is applied to the second torque limiter.

According to the present aspect, the torque changing unit can be easily configured.

According to a tenth aspect of the invention, in the first aspect to the eighth aspect, the torque limiter includes a first torque limiter and a second torque limiter, and the torque changing unit includes a switching unit that performs switching between a state in which the rotational torque is applied to one of the first torque limiter and the second torque limiter and a state in which the rotational torque is applied to both the first torque limiter and the second torque limiter.

According to the present aspect, the torque changing unit can be easily configured.

According to an eleventh aspect of the invention, in any one of the first aspect to the third aspect, the medium feeding apparatus further includes a power transmission mechanism disposed between the torque limiter and the separation roller, in which the power transmission mechanism includes a first power transmission path, a second power transmission path that has a reduction ratio that is different from a reduction ratio of the first power transmission path, and a switching unit that performs switching between the first power transmission path and the second power transmission path.

According to the present aspect, the torque changing unit can be easily configured.

According to a twelfth aspect of the invention, in the first aspect, the medium feeding apparatus further includes a controller that serves as a speed changing unit for controlling the driving source.

According to the present aspect, the rotational speed of the separation roller can be controlled by the controller.

According to a thirteenth aspect of the invention, in the twelfth aspect, the controller may control at least one of the load changing unit or the torque changing unit.

According to the present aspect, at least one of the load changing unit and the torque changing unit can be controlled.

According to a fourteenth aspect of the invention, in the twelfth aspect and the thirteenth aspect, the separation roller is capable of switching between a separation state of performing separation of the medium and a non-separation state of not performing separation of the medium, and the controller is capable of selecting a separation mode of performing feeding in which the separation roller is in the separation state and a non-separation mode of performing feeding in which the separation roller is in the non-separation state, based on a kind of the fed medium.

According to the present aspect, the controller can select whether to perform the feeding in the separation mode or to perform the feeding in the non-separation mode according to the type of the medium, and can more appropriately feed various kinds of media.

According a fifteenth aspect of the invention, in the fourteenth aspect, the separation roller may be rotationally driven by the driving source in the first rotation direction, and the controller may rotationally drive the separation roller in the first rotation direction by a predetermined rotation amount, before the separation mode is executed.

According the present aspect, before the separation mode is executed, the controller may rotationally drive the separation roller in the first rotation direction by a predetermined rotation amount to certainly nip the medium between the separation roller and the feeding roller and to reduce a possibility that the medium is not fed.

According to a sixteenth aspect of the invention, in the first aspect, when a second medium having a thickness that is relatively thinner than a thickness of a first medium is separated, at least one of the pressing load, the rotational speed, or the limit torque is suppressed as compared to a case where the first medium is separated.

According to the present aspect, when the second medium which is relatively thinner than the first medium is separated, at least one of the pressing load, the rotational speed, and the limit torque is suppressed as compared to a case where the first medium is separated. Thus, separation resistance by the separation roller can be reduced, and a possibility that the second medium is damaged due to the separation by the separation roller can be reduced.

According to a seventeenth aspect of the invention, in the first aspect, when the second medium having a frictional force that is relatively higher than a frictional force of the first medium is separated, at least one of the pressing load, the rotational speed, or the limit torque increases as compared to a case where the first medium is separated.

Accordingly, when the second medium having a frictional force relatively higher than the first medium is separated, at least one of the pressing load, the rotational speed, and the limit torque increases as compared to a case where the first medium is separated. Thus, separation resistance by the separation roller can be increased, and the second medium having a high frictional force, that is, a medium that is difficult to separate, can be separated more certainly.

According to an eighteenth aspect of the invention, in the first aspect or the second aspect, when the second medium having a thickness that is relatively thicker than a thickness of the first medium is separated, the pressing load increases as compared to a case where the first medium is separated.

When the medium to be fed is the second medium that is relatively thicker than the first medium, the medium may not be fed by the feeding roller, and a non-feeding state may be obtained.

According to the present aspect, when the second medium that is relatively thicker than the first medium is separated, the pressing load increases as compared to a case where the first medium is separated. Thus, the medium can be nipped between the separation roller and the feeding roller, and feedability by the feeding rollers can be improved. Accordingly, it is possible to reduce a possibility that a cardboard is not fed.

An image reading apparatus according to a nineteenth aspect of the invention includes a reading unit that reads a medium and the medium feeding apparatus according to the first aspect to the eighteenth aspect, which feeds the medium to the reading unit.

According to the present aspect, in the image reading apparatus including the medium feeding apparatus that feeds the medium to the reading unit, the same effect as the effect of any one of the first aspect to the eighteenth aspect can be obtained.

Hereinafter, the invention will be described in detail.

First Embodiment

Further, an outline of an image reading apparatus including the medium feeding apparatus according to a first embodiment will be described.

In the present embodiment, a document scanner (hereinafter, simply referred to as a scanner 1) that can read at least one surface among a front surface and a rear surface of a paper sheet as the "medium" is described as an example of the image reading apparatus.

Figure 2:
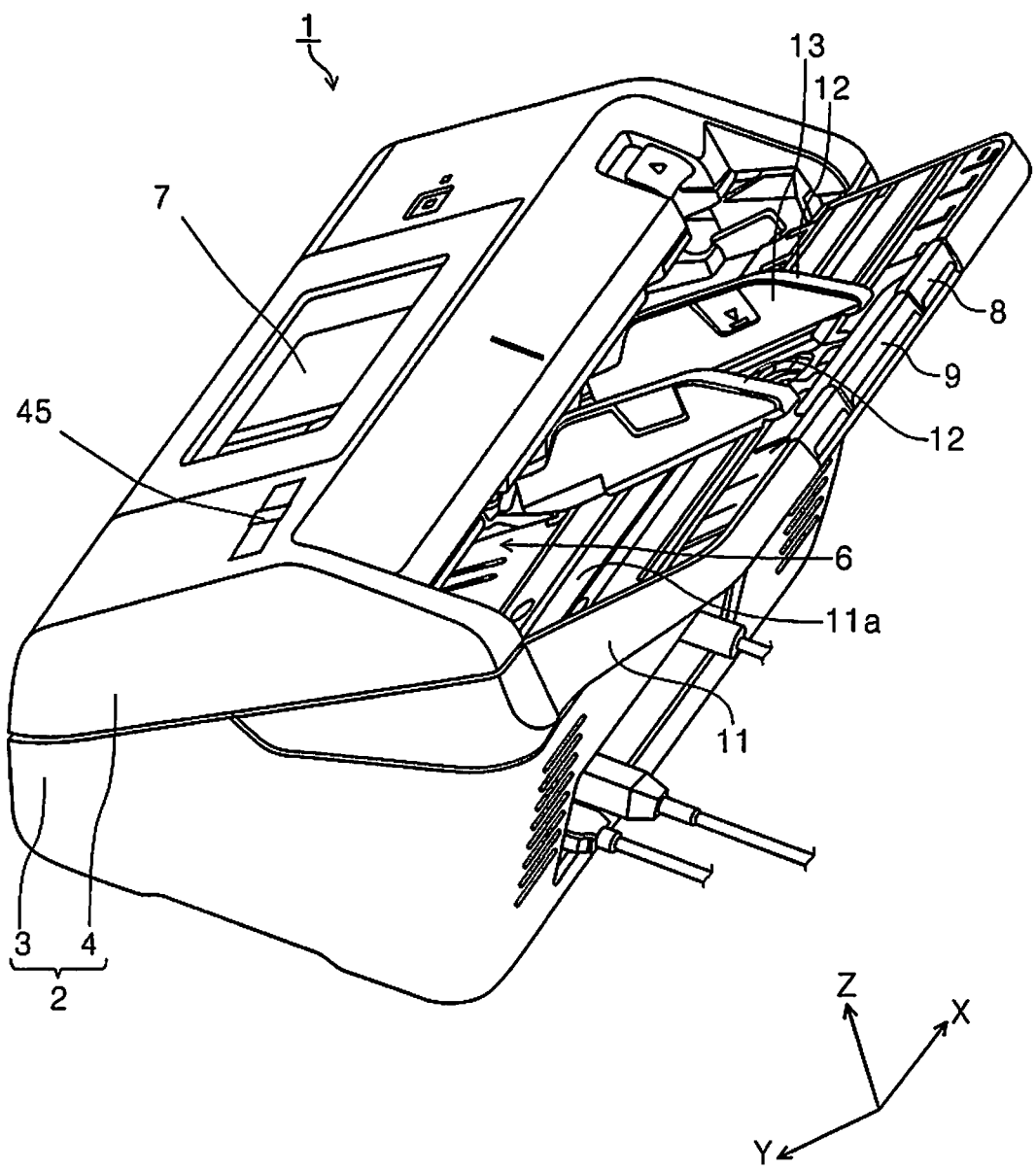
FIG. 2 is a perspective view illustrating the scanner according to the invention when viewed from a different angle from FIG. 1.
Figure 3:
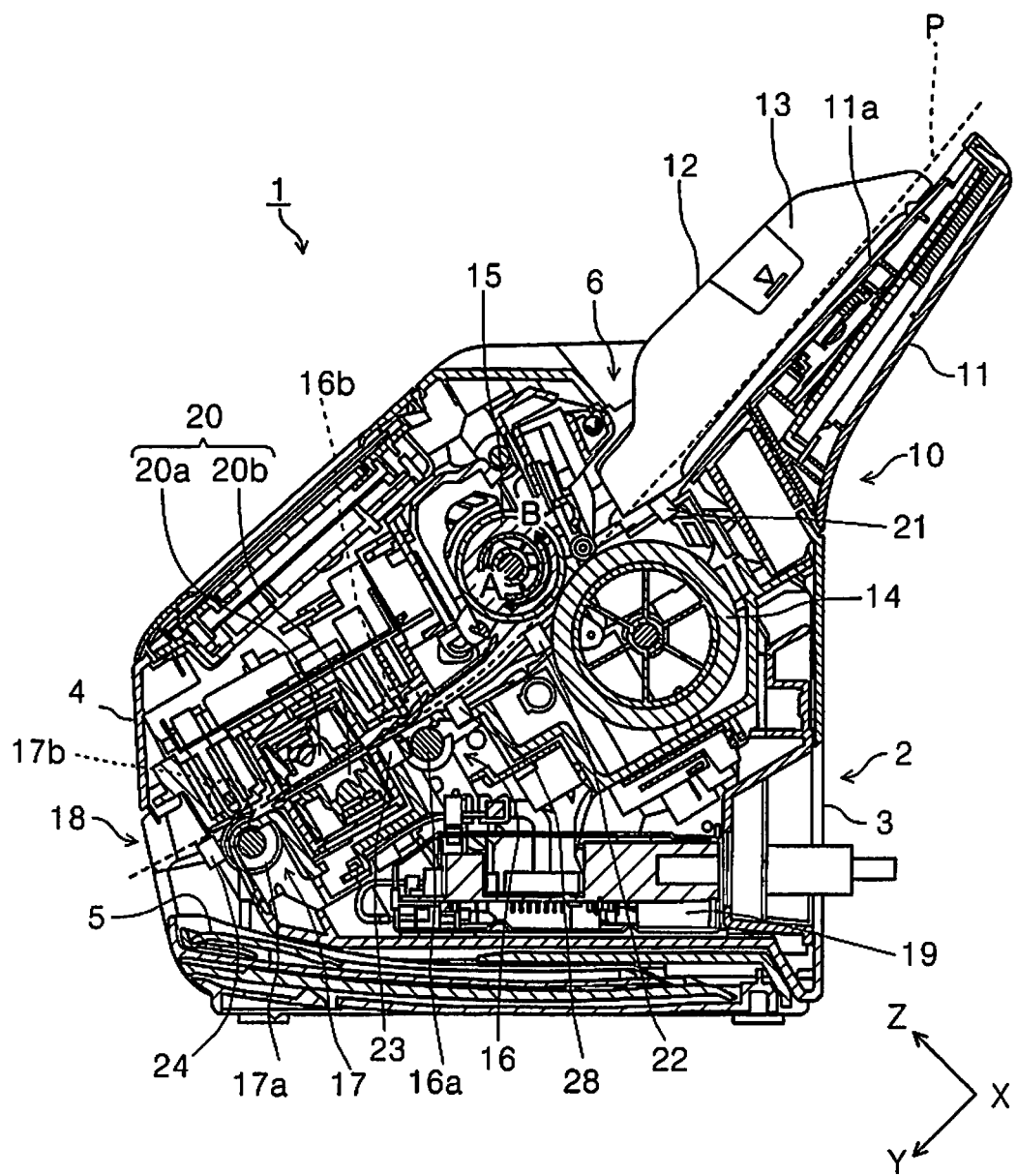
FIG. 3 is a side sectional view illustrating a paper sheet transporting path in the scanner according to the invention.
Figure 4:
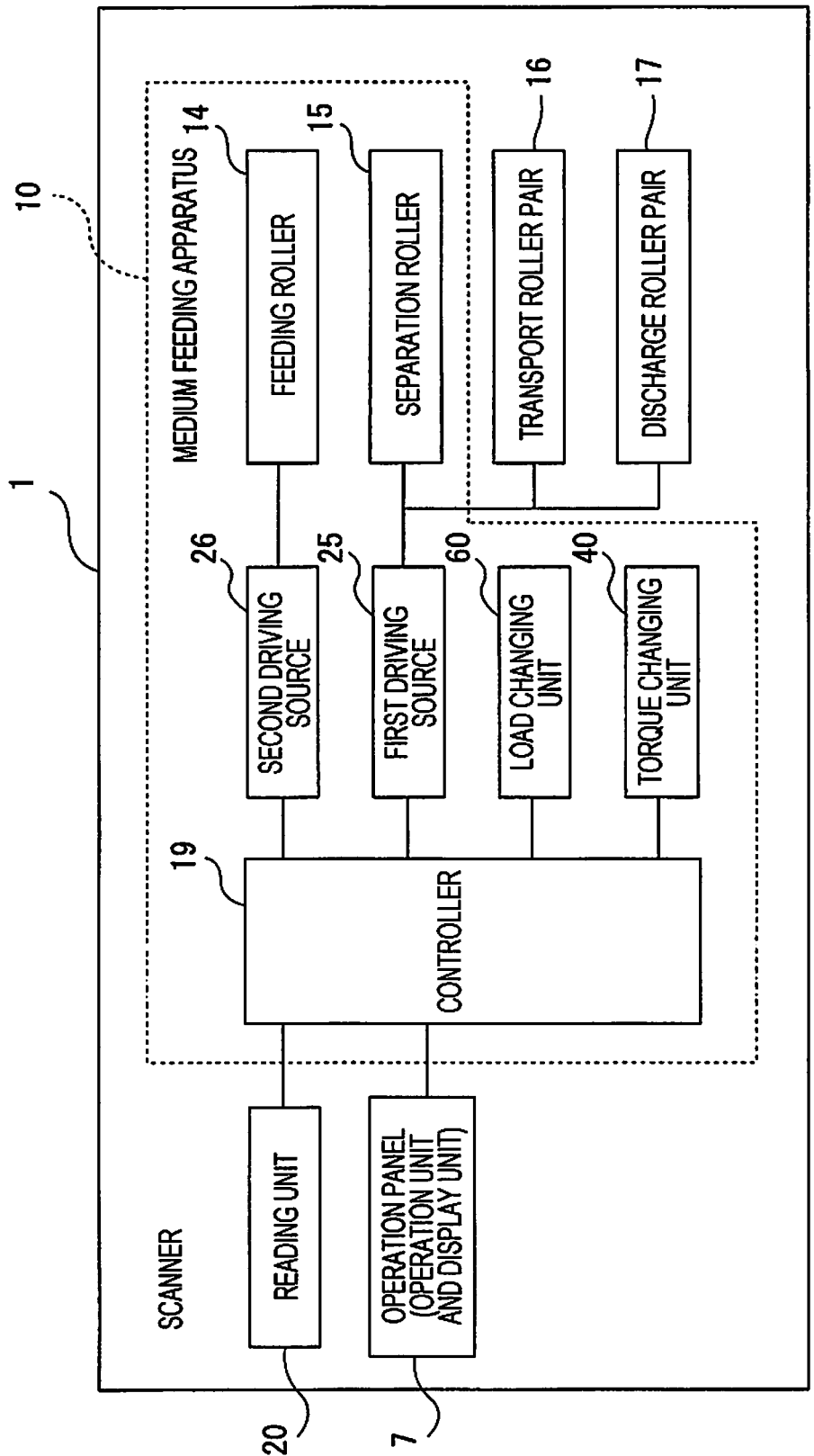
FIG. 4 is a block diagram illustrating a configuration of the scanner according to the invention.
Figure 5:
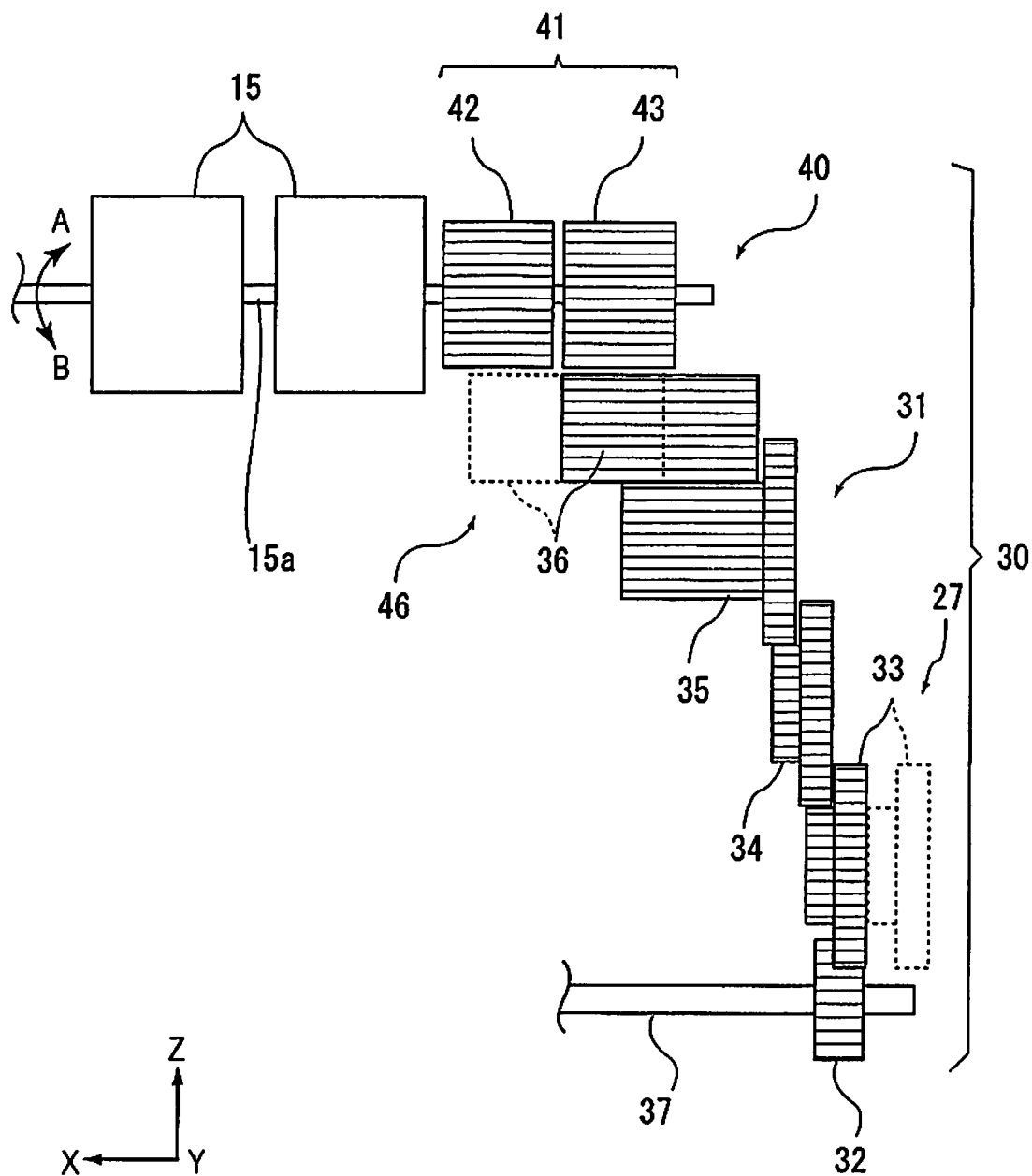
FIG. 5 is a schematic view illustrating a part of a power transmission mechanism that transmits power of a first driving source to a separation roller.
Figure 6:
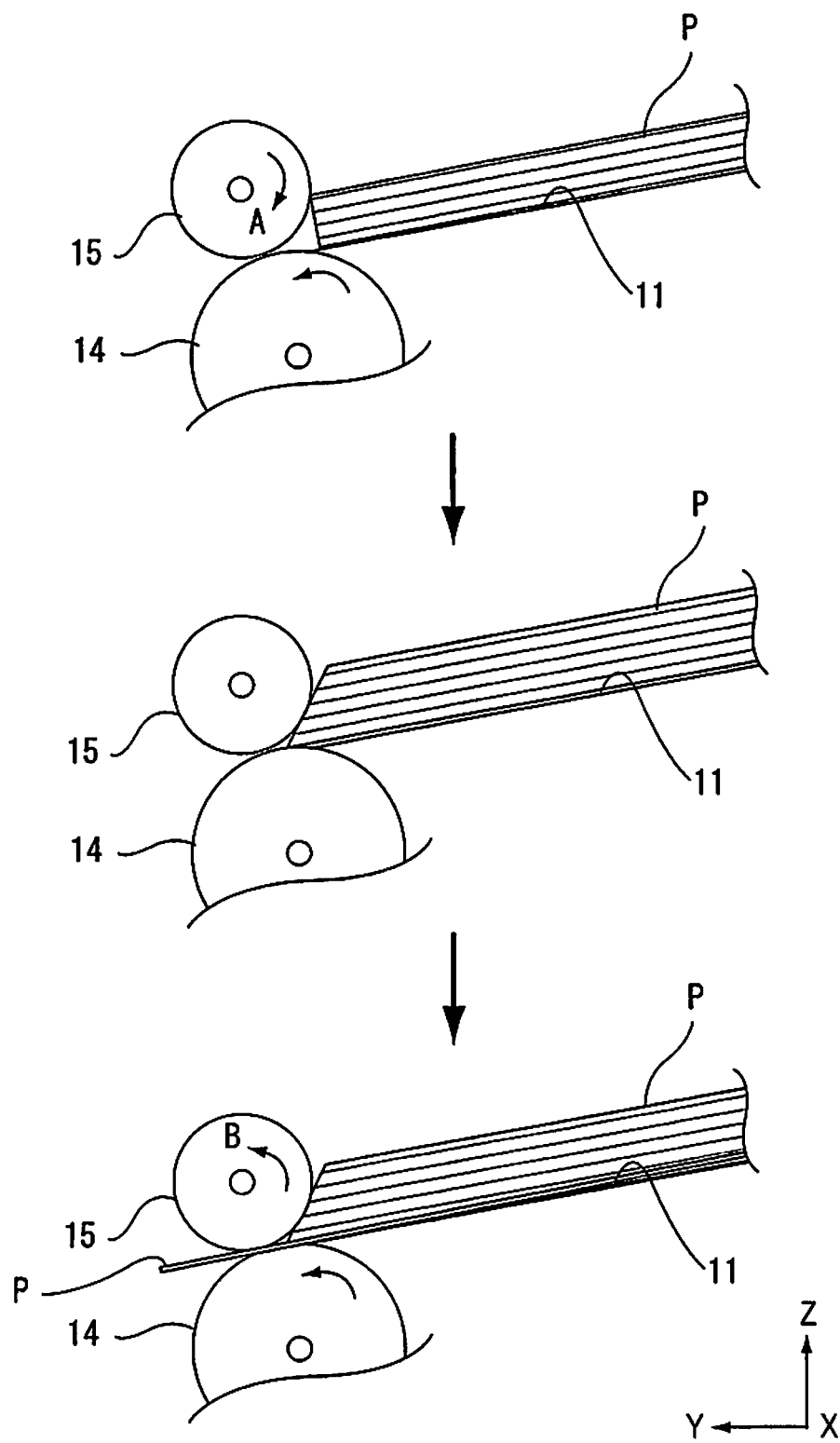
FIG. 6 is a diagram illustrating an operation of the separation roller.
Figure 7:
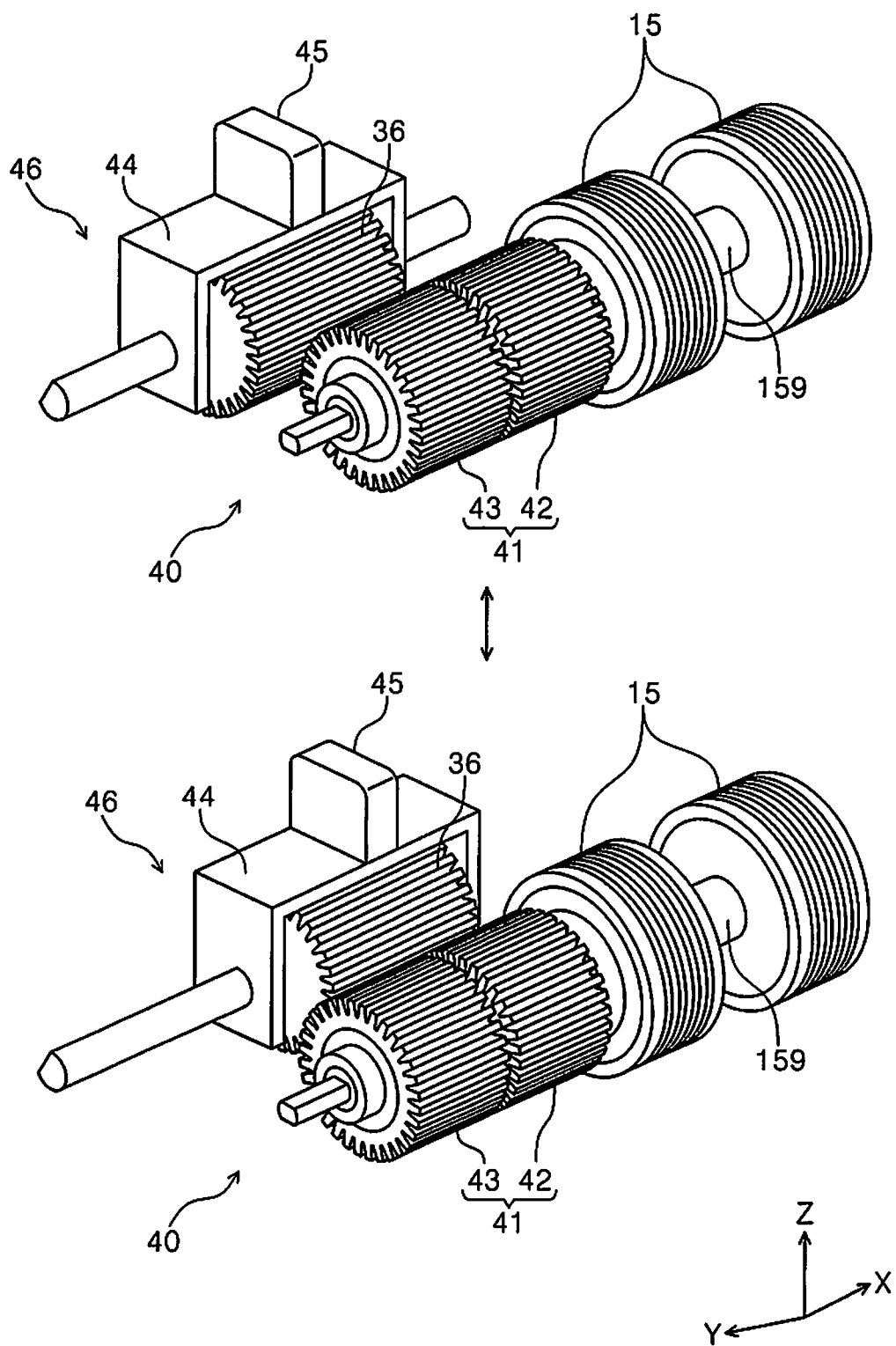
FIG. 7 is a perspective view illustrating a torque changing unit.
Figure 8:
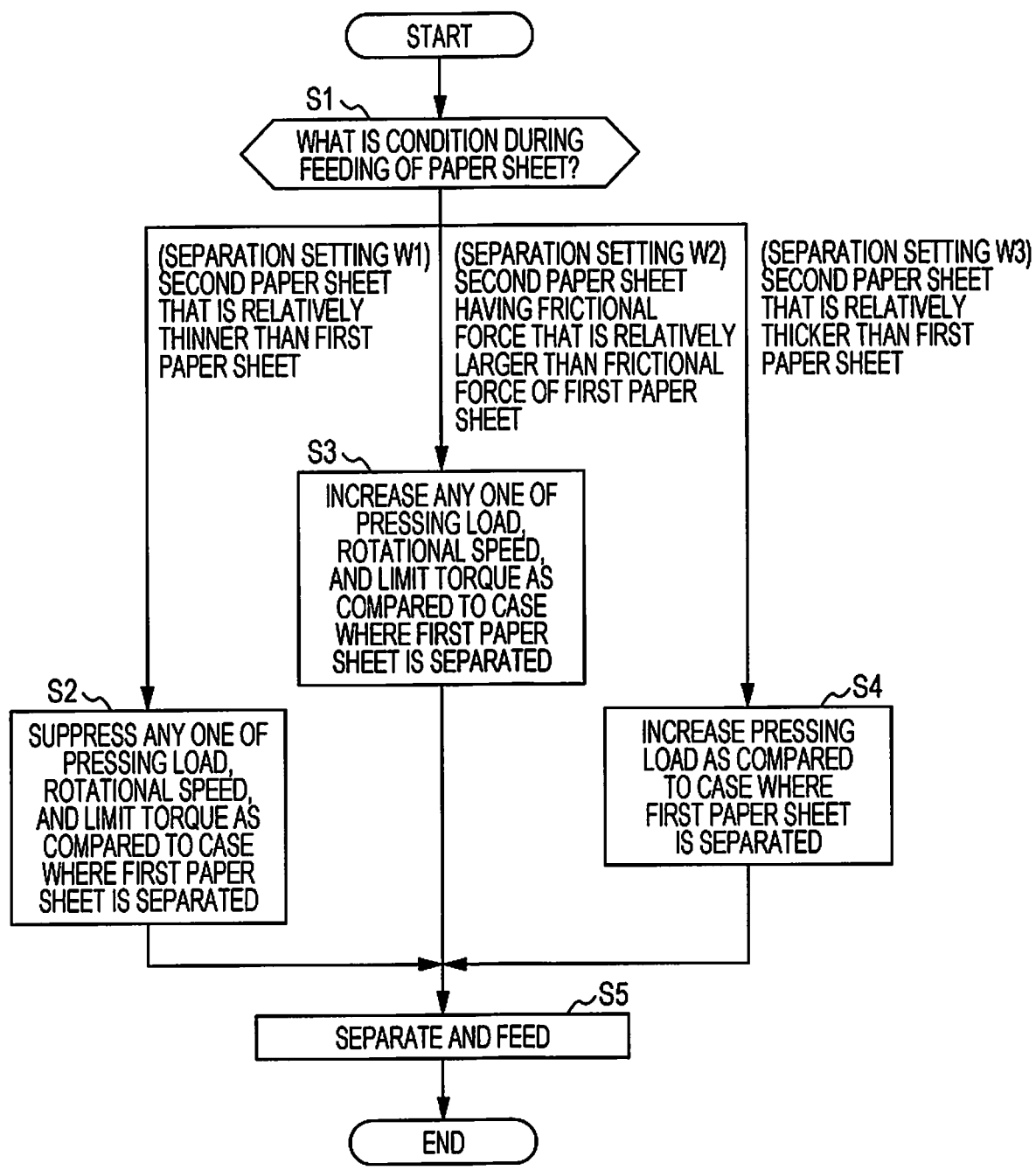
FIG. 8 is a flowchart illustrating an example of a separation mode.
Figure 9:
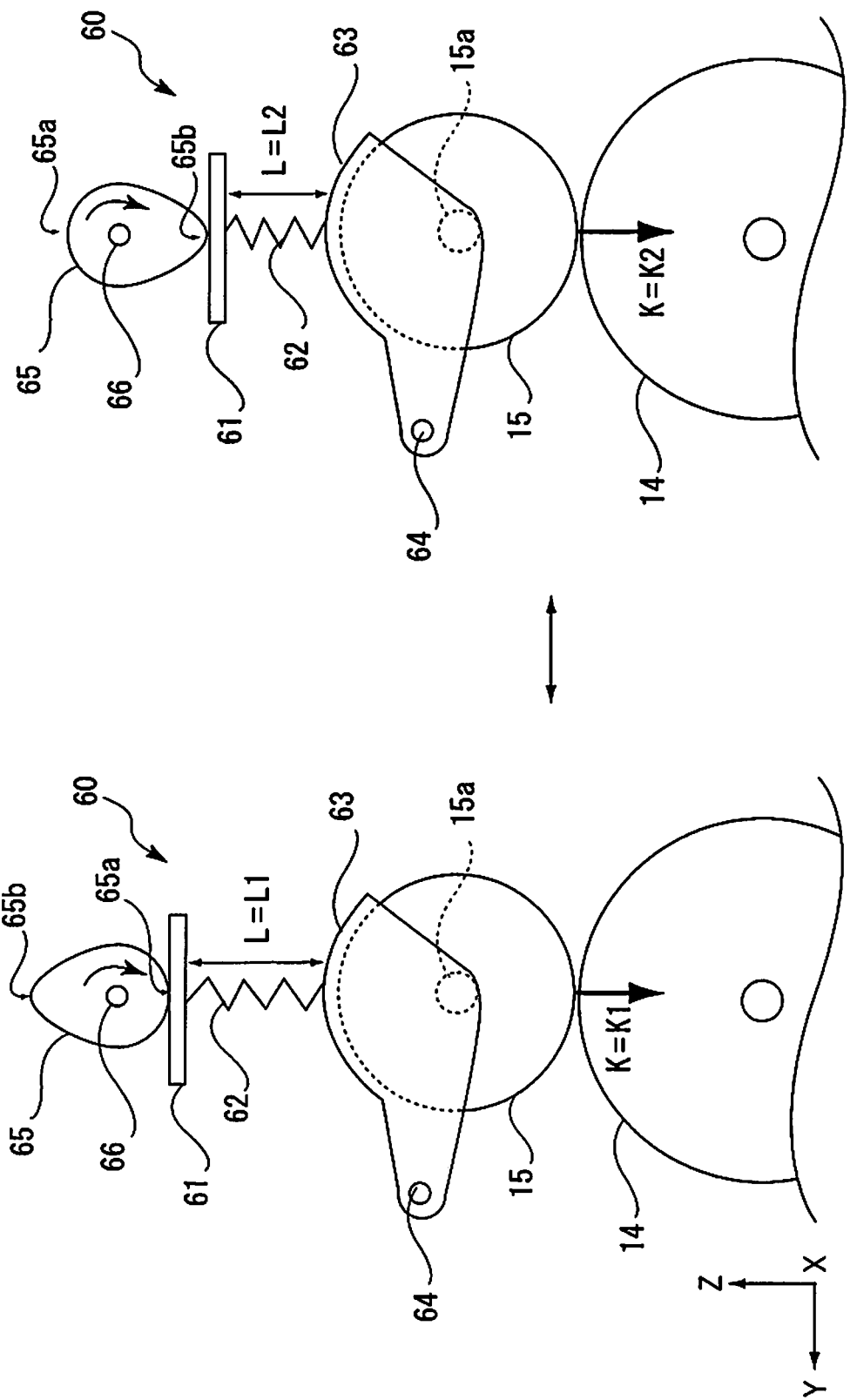
FIG. 9 is a schematic side view illustrating a load changing unit.

FIG. 1 is a perspective view illustrating an outer appearance of a scanner according to the invention. FIG. 2 is a perspective view illustrating the scanner according to the invention when viewed from a different angle from FIG. 1. FIG. 3 is a side sectional view illustrating a paper sheet transporting path in the scanner according to the invention. FIG. 4 is a block diagram illustrating a configuration of the scanner according to the invention. FIG. 5 is a schematic view illustrating a part of a power transmission mechanism that transmits power of a first driving source to a separation roller. FIG. 6 is a diagram illustrating an operation of the separation roller. FIG. 7 is a perspective view illustrating a torque changing unit. FIG. 8 is a flowchart illustrating an example of a separation mode. FIG. 9 is a schematic side view illustrating a load changing unit.

Figure 10:
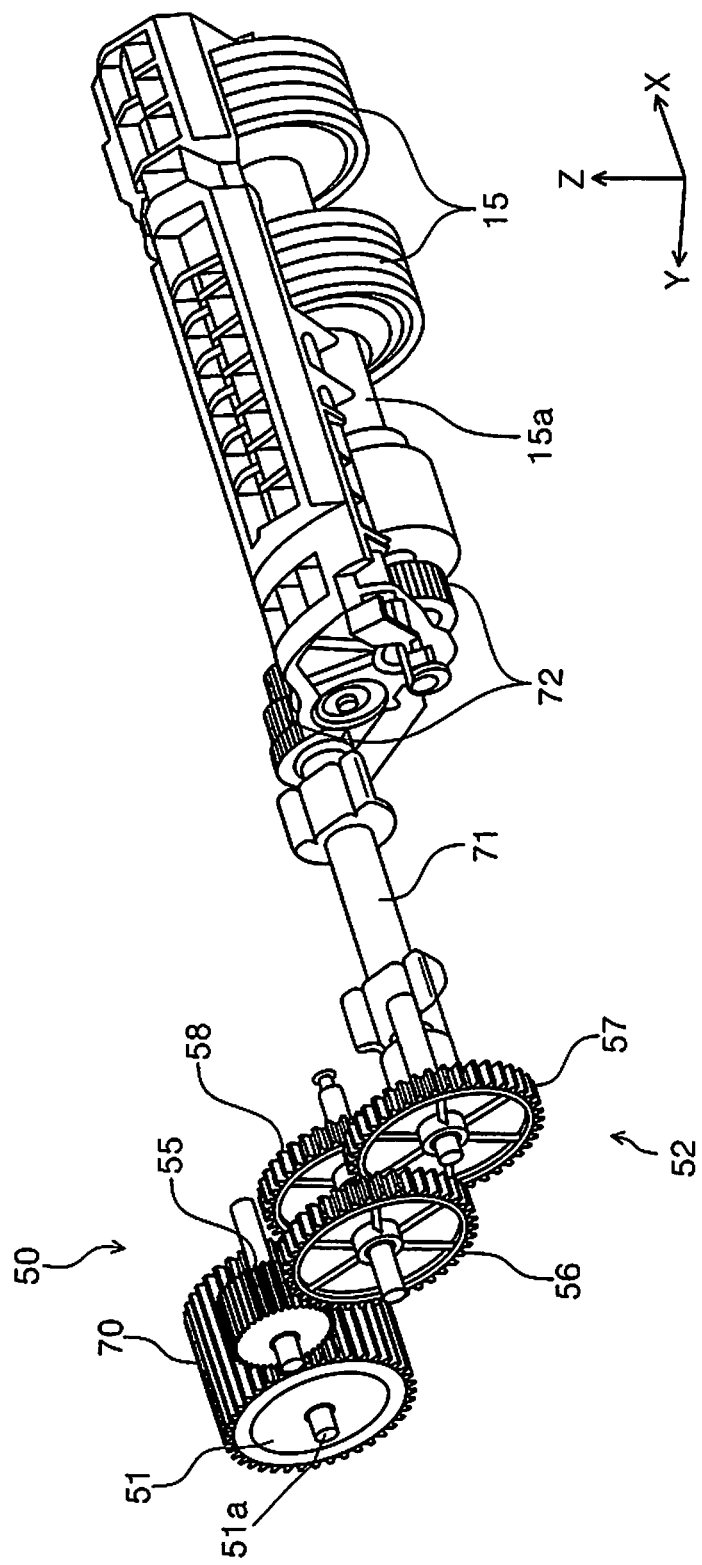
FIG. 10 is a perspective view illustrating modification example 1 of the torque changing unit.
Figure 11:
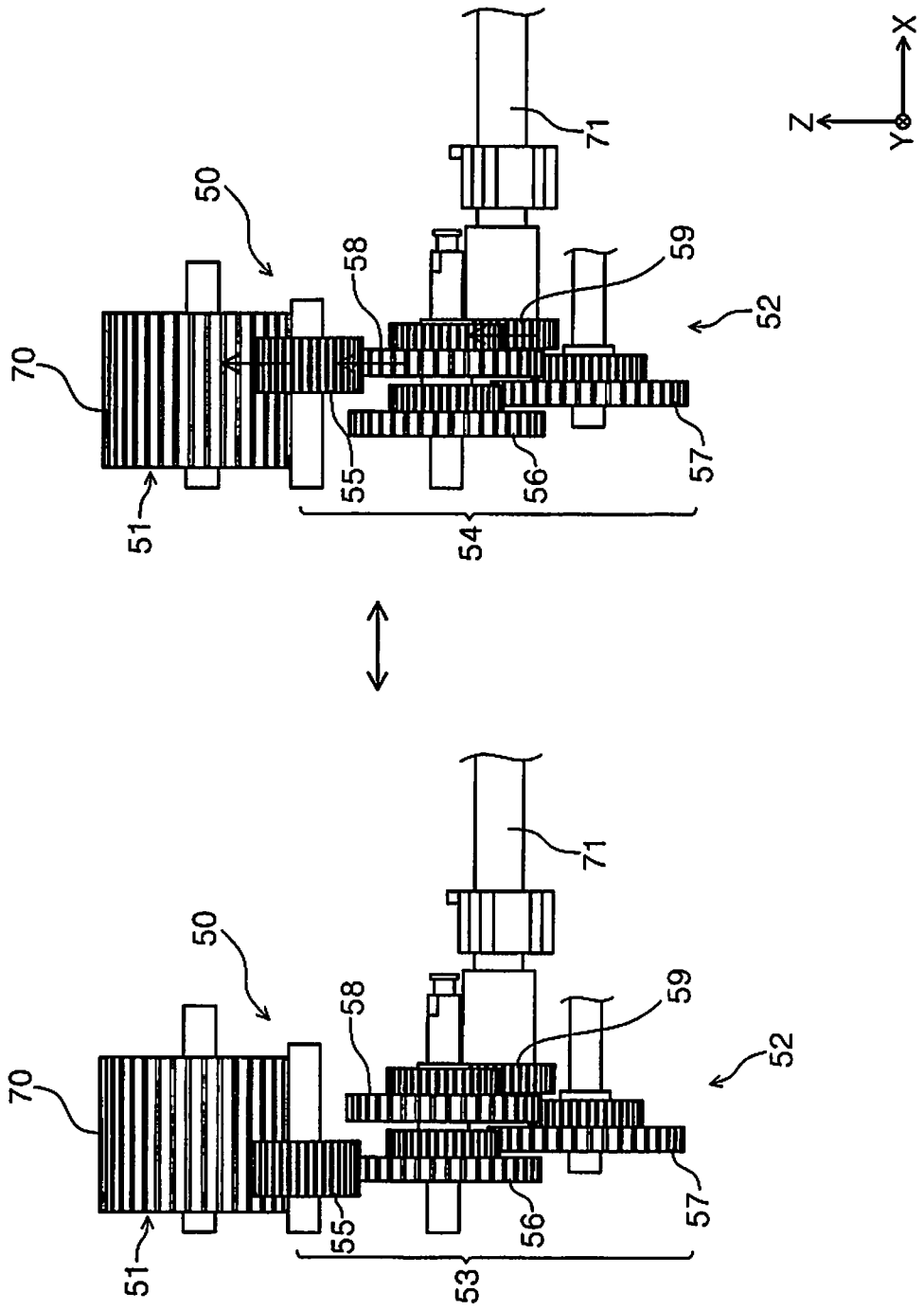
FIG. 11 is an enlarged view illustrating a main part of modification example 1 of the torque changing unit.
Figure 12:
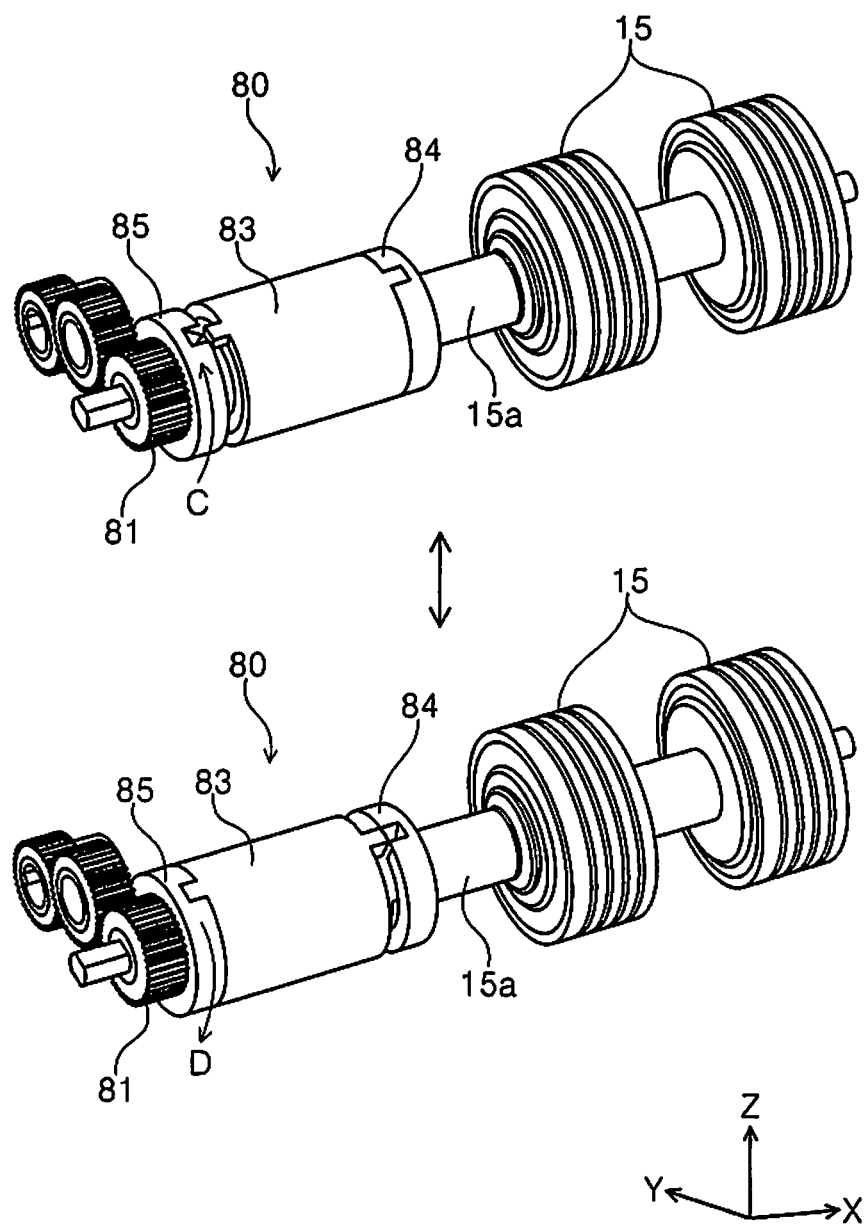
FIG. 12 is a perspective view illustrating modification example 2 of the torque changing unit.
Figure 13:
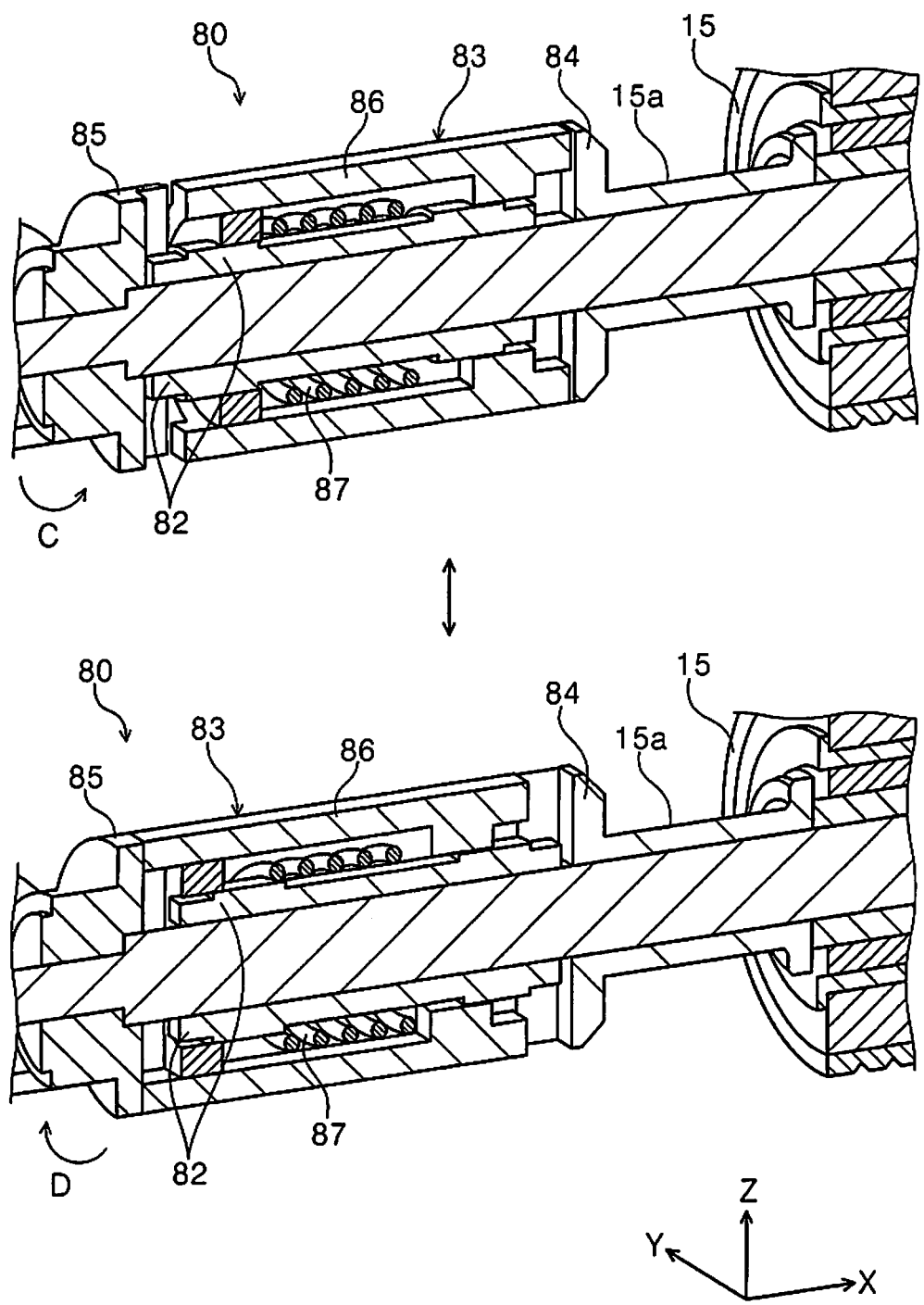
FIG. 13 is a sectional view illustrating modification example 2 of the torque changing unit.
Figure 15:
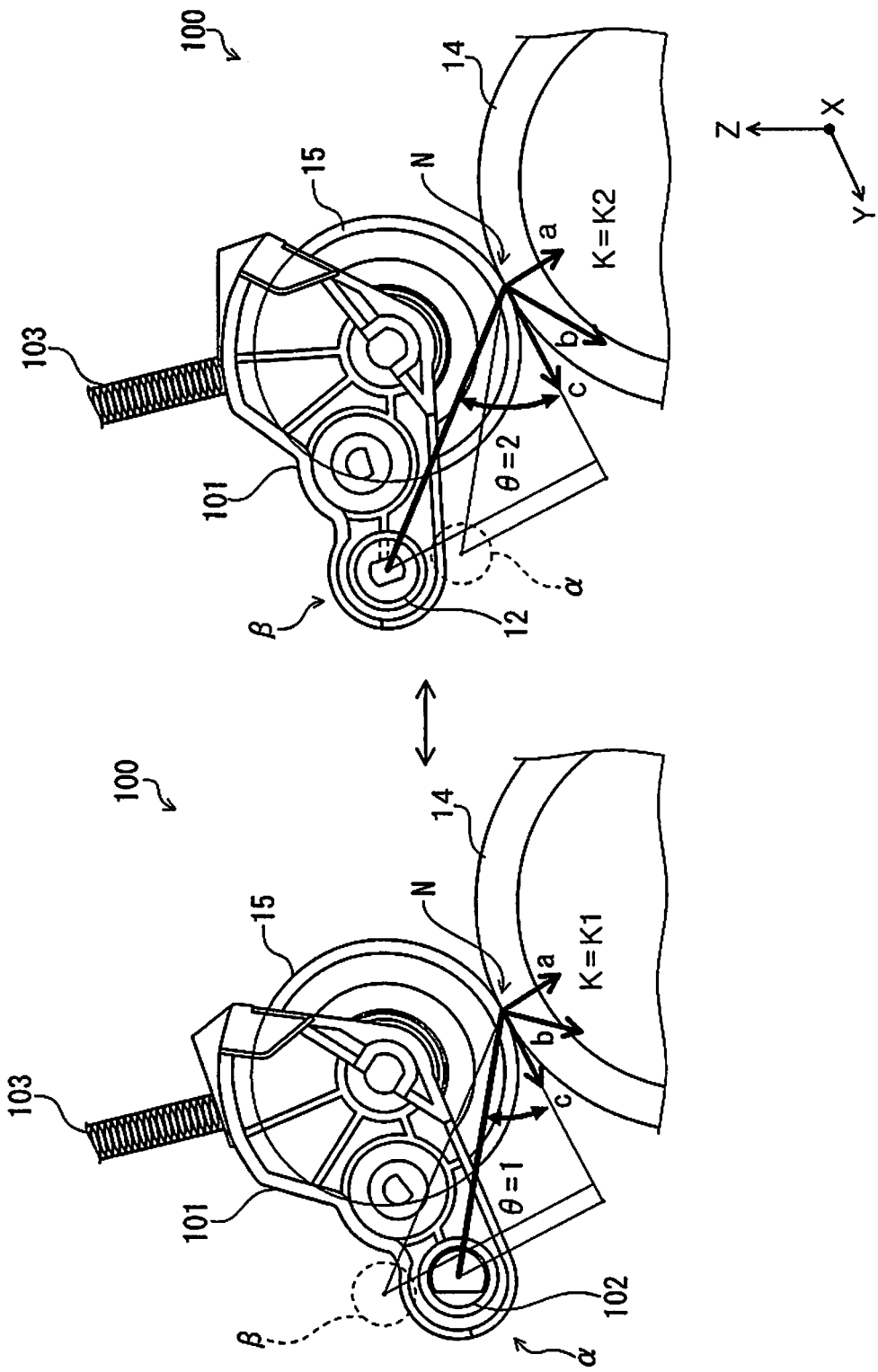
FIG. 15 is a side view illustrating modification example 2 of the load changing unit.
Figure 16:
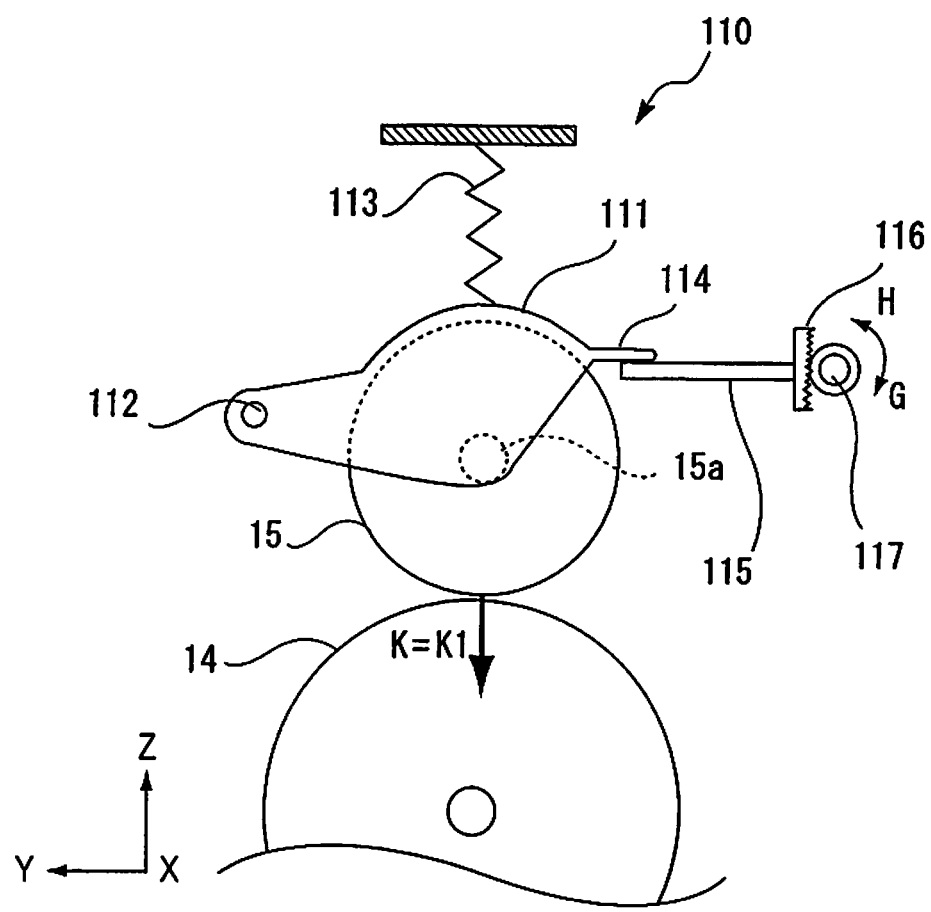
FIG. 16 is a schematic view illustrating modification example 3 of the load changing unit.
Figure 17:
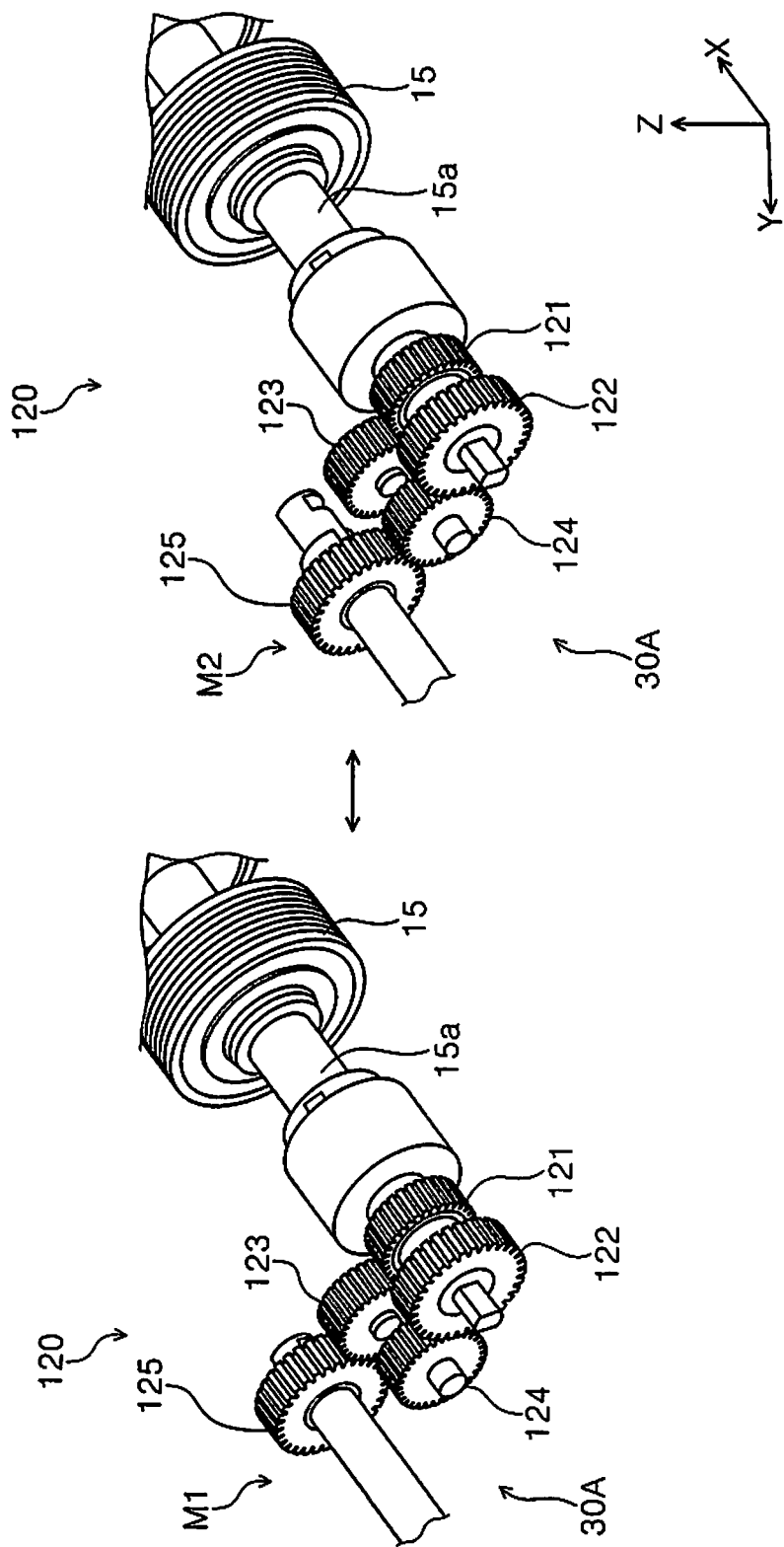
FIG. 17 is a perspective view illustrating modification example 4 of the load changing unit.

FIG. 10 is a perspective view illustrating modification example 1 of the torque changing unit. FIG. 11 is an enlarged view illustrating a main part of modification example 1 of the torque changing unit. FIG. 12 is a perspective view illustrating modification example 2 of the torque changing unit. FIG. 13 is a sectional view illustrating modification example 2 of the torque changing unit. FIG. 14 is a schematic view illustrating modification example 1 of the load changing unit. FIG. 15 is a side view illustrating modification example 2 of the load changing unit. FIG. 16 is a schematic view illustrating modification example 3 of the load changing unit. FIG. 17 is a perspective view illustrating modification example 4 of the load changing unit.

In an X-Y-Z coordinate system in the drawing, an X direction is a width direction of a paper sheet, which is a width direction of the apparatus, and a Y direction is a paper sheet transporting direction. A Z direction is a direction intersecting the Y direction, and generally indicates a direction that is perpendicular to a surface of a transported paper sheet. Further, a front apparatus surface side is set as a +Y direction, and a rear apparatus surface side is set as a −Y direction. Further, a left side when viewed from the front apparatus surface side is set as a +X direction, and a right side when viewed from the front apparatus surface side is set as a −X direction. Further, an upper apparatus side (including an upper portion, an upper surface, and the like) is set as a +Z direction, and a lower apparatus side (including a lower portion, a lower surface, and the like) is set as a −Z direction. Further, a direction (the +Y direction side) in which the paper sheet is fed is set as a "downstream side", and a direction (the −Y direction side) that is opposite to the direction is set as an "upstream side".

Overview of Scanner

Hereinafter, a scanner 1 according to the invention will be described mainly with reference to FIGS. 1 and 2.

The scanner 1 illustrated in FIGS. 1 and 2 includes a reading unit 20 (FIG. 3) that reads an image of a paper sheet P (a medium) inside an apparatus body 2.

The apparatus body 2 includes a lower unit 3 and an upper unit 4. The upper unit 4 can be provided to be openable with respect to the lower unit 3 with a downstream side of a paper sheet transporting direction as a pivot point, the upper unit 4 can be pivoted and opened to a front apparatus surface side, a paper sheet transporting path for the paper sheet P can be exposed, and removal of a paper jam of the paper sheet P and a maintenance process such as cleaning can be easily performed.

A medium placing unit 11 on which the paper sheet P is placed is provided on a rear surface side of the apparatus body 2 (the −Y direction side). Reference numeral 11a denotes a placement surface 11a of the paper sheet P.

The medium feeding apparatus 10 (FIG. 3) that feeds the paper sheet P from the medium placing unit 11 to the reading unit 20 is provided inside the apparatus body 2.

Further, in the scanner 1, the medium placing unit 11 is provided detachably with respect to the apparatus body 2. Further, a configuration of the medium feeding apparatus 10 will be described below.

Further, a pair of left and right edge guides 12 and 12 including guide surfaces 13 that guide side edges of the paper sheet P in a width direction (the X axis direction) intersecting a feeding direction (the Y direction) of the paper sheet P is provided in the medium placing unit 11.

The edge guides 12 and 12 are provided to be slidable in the X axis direction according to the size of the paper sheet P. In the present embodiment, the edge guides 12 and 12 are configured such that one edge guide 12 (the −X side) is moved in an opposite direction according to X movement of the other edge guide 12 (for example, the +X side), by a widely known rack and pinion mechanism.

That is, in the medium placing unit 11, the paper sheet P is disposed at the center of a width direction, the feeding rollers 14, which will be described below, are provided at the central area of the width direction, and paper feeding is performed by a so-called center paper feeding method. FIG. 1 illustrates a state in which the edge guides 12 and 12 are located in an outermost position, and FIG. 2 illustrates a state in which the edge guides 12 and 12 are located in an innermost position.

As illustrated in FIG. 1, the medium placing unit 11 includes a first auxiliary paper support 8 and a second auxiliary paper support 9. As illustrated in FIG. 2, the first auxiliary paper support 8 and the second auxiliary paper support 9 may be accommodated inside the medium placing unit 11. Meanwhile, as illustrated in FIG. 1, the first auxiliary paper support 8 and the second auxiliary paper support 9 may be withdrawn from the medium placing unit 11, so that the length of the placement surface 11*a* can be adjusted.

The apparatus body 2 includes an operation panel 7 serving both as an operation unit that operates various kinds of reading setting and reading execution and a display unit that displays contents of the reading setting and the like, on a front apparatus side of the upper unit 4.

A feeding port 6 connected to an inside of the apparatus body 2 is provided at an upper portion of the upper unit 4, and the paper sheet P placed on the medium placing unit 11 is fed from the feeding port 6 to the reading unit 20 (FIG. 3) provided inside the apparatus body 2.

Further, a paper discharging tray 5, which will be described below, is provided on a front apparatus surface side of the lower unit 3.

Paper Sheet Transporting Path of Scanner

Next, the paper sheet transporting path of the scanner 1 will be described mainly with reference to FIG. 3. Further, a dotted line of FIG. 3 illustrates a transport path for the paper sheet P.

In the scanner 1, the paper sheet P which is a manuscript is fed to the reading unit 20 by the medium feeding apparatus 10.

In the present embodiment, the medium feeding apparatus 10 illustrated in FIG. 3 includes the medium placing unit 11, the feeding rollers 14 that feed the paper sheet P from the medium placing unit 11 to the reading unit 20, and the separation rollers 15 that nip the paper sheet P between the feeding rollers 14 and the separation rollers 15 to separate the paper sheet P, which have been described above. In FIG. 3, the separation rollers 15 receive a driving torque from a first driving source 25 (FIG. 4), which will be described below, in a second rotation direction B that is opposite to a first rotation direction A in which the paper sheet P is fed to a downstream side (the +Y direction side).

Further, when a rotational torque applied to the separation rollers 15 in the first rotation direction A (FIG. 3) exceeds a limit torque that is a predetermined upper torque limit, a torque limiter (as an example, a torque limiter 41 of FIG. 7) that causes the separation rollers 15 to idle in the first rotation direction A is provided.

The rotational torque applied to the separation rollers 15 in the first rotation direction A (FIG. 3) is applied by the feeding rollers 14 when the paper sheet P is not interposed between the separation rollers 15 and the feeding rollers 14, and is applied by the paper sheet P when the paper sheet P is interposed between the separation rollers 15 and the feeding rollers 14. When the rotational torque applied to the separation rollers 15 in the first rotation direction A (FIG. 3) exceeds the limit torque, the separation rollers 15 rotate in the first rotation direction A (FIG. 3) by the rotational torque received from the feeding rollers 14 or the paper sheet P. In the specification, this is defined as idling of the separation rollers 15. The rotation (the idling) of the separation rollers 15 is generated in a state in which the paper sheet P is not interposed between the separation rollers 15 and the feeding rollers 14 and in a state in which the paper sheet P is interposed between the separation rollers 15 and the feeding rollers 14 but double feeding is not generated.

Thus, when, for example, a plurality of paper sheets P are interposed between the separation rollers 15 and the feeding rollers 14, that is, the double feeding is generated, the rotational torque applied to the separation rollers 15 in the first rotation direction A (FIG. 3) is lower than the limit torque, so that the separation rollers 15 are rotated in the second rotation direction B (FIG. 3) by the driving torque received from the first driving source 25 (FIG. 4). Accordingly, the double-fed paper sheet P returns to an upstream side.

As described above, in the specification, the "limit torque" means not an idle torque of the torque limiter itself but a torque serving as a boundary of whether or not the separation rollers 15 idle. As the limit torque is smaller, the separation rollers 15 more easily rotate in the first rotation direction A (FIG. 3). In contrast, when the limit torque is large, a force required for rotating the separation rollers 15 in the first rotation direction A (FIG. 3) increases. The torque changing unit, which will be described below, is a unit that changes the limit torque.

Further, the medium feeding apparatus 10 has a load changing unit (as an example, the load changing unit 60 of FIG. 4) that changes a pressing load of the separation rollers 15 against the feeding rollers 14, a controller 19 as a "speed changing unit" that changes a rotational speed of a first driving source as a "driving source" that drives the separation rollers 15, and a torque changing unit (as an example, the torque changing unit 40 of FIG. 4) that changes the limit torque.

The controller 19 controls driving of the first driving source 25 (FIG. 4) as a driving source of the separation rollers 15 to change a rotational speed of the separation rollers 15.

Thus, the medium feeding apparatus 10 can change separation setting including the pressing load, the rotational speed, and the limit torque, according to conditions during paper sheet feeding by the feeding rollers 14.

Details of a specific example where the separation setting is changed, a configuration of the load changing unit 60, and configurations of the torque limiter 41 and the torque changing unit 40 will be described below.

The pair of feeding rollers 14 are provided at a central area of the width direction (the X axis direction) intersecting a medium transporting direction (the +Y direction). Further, the separation rollers 15 are provided to face the feeding rollers 14. As illustrated in FIG. 5, the pair of separation rollers 15 also are provided to correspond to the feeding rollers 14.

The paper sheet P placed on the medium placing unit 11 is picked up by the feeding rollers 14 provided rotatably with respect to the lower unit 3 and is fed to a downstream side (the +Y direction side). In detail, as the feeding rollers 14 rotate while coming into contact with a surface of the paper sheet P facing the medium placing unit 11, the paper sheet P is fed to the downstream side. Therefore, when the plurality of paper sheets P are set on the medium placing unit 11 in the scanner 1, the paper sheets P are fed to the downstream side in an order from the placement surface 11*a* side.

A transport roller pair 16, the reading unit 20, and a discharge roller pair 17 are provided on a downstream side of the feeding rollers 14.

The transport roller pair 16 is provided on an upstream side of the reading unit 20 to transport the paper sheet P fed by the feeding rollers 14 to the reading unit 20. The transport roller pair 16 include a transport driving roller 16*a* and a transport driven roller 16*b*.

A double feeding detecting unit 28 that detects the doubling feeding of the paper sheet P is provided on an upstream side of the transport roller pair 16, which is a downstream side of the feeding rollers 14. An ultrasonic sensor including a transmission unit that emits an ultrasonic wave and a reception unit that is provided to face the transmission unit with a transported paper sheet interposed therebetween can be used as the double feeding detecting unit 28.

The reading unit 20 includes an upper portion reading sensor 20*a* provided on the upper unit 4 side and a lower portion reading sensor 20*b* provided on the lower unit 3 side. In the present embodiment, as an example, the upper portion reading sensor 20*a* and the lower portion reading sensor 20*b* are configured as a contact image sensor module (CISM).

After the reading unit 20 reads at least one surface among the front surface and the rear surface of the paper sheet P, the paper sheet P is nipped by the discharge roller pair 17 located on a downstream side of the reading unit 20 and is discharged from a discharge port 18 provided on the front apparatus surface side of the lower unit 3. The discharge roller pair 17 includes a discharge driving roller 17*a* and a discharge driven roller 17*b*.

In the present embodiment, the feeding rollers 14, the separation rollers 15, the transport driving roller 16*a*, and the discharge driving roller 17*a* are rotationally driven by at least one driving source provided inside the lower unit 3.

The separation rollers 15 are rotationally driven by the first driving source 25 (FIG. 4), which has been described below. Further, in the present embodiment, the transport driving roller 16*a* and the discharge driving roller 17*a* are driven by the first driving source 25 common to the separation rollers 15. The feeding rollers 14 are driven by a second driving source 26 that is different from the first driving source 25.

As illustrated in FIG. 4, operations of the first driving source 25 and the second driving source 26 are controlled by the controller 19. Therefore, driving of the feeding rollers 14, the separation rollers 15, the transport driving roller 16*a*, and the discharge driving roller 17*a* is controlled. In other words, a feeding operation of the paper sheet P is controlled by the controller 19.

Further, the paper discharging tray 5 that can be withdrawn from the discharge port 18 to the front apparatus surface side is provided in the lower unit 3. The paper discharging tray 5 is in a state (FIG. 1) in which the paper discharging tray 5 is accommodated in a lower portion of the lower unit 3 and in a state in which the paper discharging tray 5 is withdrawn to the not illustrated front apparatus surface side In a state in which the paper discharging tray 5 is withdrawn, the paper sheet P discharged from the discharge port 18 can be stacked on the paper discharging tray 5.

Further, as illustrated in FIG. 3, a first detection unit 21 that detects whether there is the paper sheet P placed on the medium placing unit 11 is provided on an inner side of a placement area of the paper sheet by the medium placing unit 11, which is a downstream side of the feeding rollers 14 in the medium transporting direction. Further, a second detection unit 22, a third detection unit 23, and a fourth detection unit 24 are successively provided on a downstream side of the feeding rollers 14, a downstream side of the transport roller pair 16, and a downstream side of the discharge roller pair 17. A position of the paper sheet P in the medium feeding direction can be detected by the second detection unit 22, the third detection unit 23, and the fourth detection unit 24. Further, a skew motion (an oblique motion) of the fed paper sheet P in the medium feeding direction can be detected by all the second detection unit 22, the third detection unit 23, and the fourth detection unit 24.

In the present embodiment, the first detection unit 21, the second detection unit 22, the third detection unit 23, and the fourth detection unit 24 are provided at the central area of the width direction.

Further, in the present embodiment, the first detection unit 21, the second detection unit 22, the third detection unit 23, and the fourth detection unit 24 use optical sensors each having a light emitting unit (not illustrated) that emits a light beam and a light receiving unit (not illustrated) that receives a light beam obtained by reflecting the light beam emitted by the light emitting unit.

The ultrasonic sensor including the transmission unit that emits an ultrasonic wave and the reception unit that is provided to face the transmission unit with a transported paper interposed therebetween, in addition to the optical sensor, can be used for the first detection unit 21 to the fourth detection unit 24. Further, a lever sensor that detects displacement of a mechanical lever moved by contact with the transported paper sheet, in an optical scheme or an electrical contact scheme, can be used.

Paper Sheet Separation During Feeding by Medium Feeding Apparatus

Separation Mode and Non-Separation Mode

Further, in the medium feeding apparatus 10, the separation rollers 15 can be switched between a separation state in which the paper sheet P is separated and a non-separation state in which the paper sheet P is not separated. Thus, when the paper sheet P is fed from the medium placing unit 11, the controller 19 can select the separation mode in which the separation rollers 15 perform feeding in the separation state or the non-separation mode in which the separation rollers 15 perform feeding in the non-separation state.

The switching between the separation state and the non-separation state of the separation rollers 15 is performed by a separation switching unit 27 illustrated in FIG. 5. The separation switching unit 27 is provided in a power transmission mechanism 30 that transmits power from the first driving source 25.

A first wheel train 31 constituting a part of the power transmission mechanism 30 is illustrated in FIG. 5. The first wheel train 31 includes a gear 32, a first moving gear 33 as the separation switching unit 27, a gear 34, a gear 35, a second moving gear 36, and the torque limiter 41 having a tooth therearound. Further, the second moving gear 36 and the torque limiter 41 constitute the torque changing unit 40 which will be described below.

The gear 32 illustrated in FIG. 5 is connected to a rotary shaft 37 of the transport driving roller 16*a* of the transport roller pair 16 (not illustrated in FIG. 5), and receives the power from the first driving source 25 through the transport roller pair 16 (driven by the power of the first driving source 25). Power received by the gear 32 of the first wheel train 31 is transmitted to the separation rollers 15 through a plurality of gears.

Further, although a transmission mechanism extending from the first driving source 25 to the transport roller pair 16 among the power transmission mechanism 30 is omitted, the power transmission mechanism 30 can be configured using a wheel train including a plurality of gears or a belt mechanism, in addition to the first wheel train 31.

Here, the first moving gear 33 is provided between a position indicated by a solid line of FIG. 5 and a position indicated by a dotted line of FIG. 5, to be displaceable in the X axis direction. When the first moving gear 33 is provided in the position indicated by the solid line of FIG. 5, the gear 32 is engaged with the gear 34, a driving force of the first driving source 25 (FIG. 4) is transmitted to the separation rollers 15, and the separation rollers 15 rotate in the second rotation direction B. This state is referred to as the "separation state" in which the paper sheet P is separated.

Further, when the first moving gear 33 is provided in the position indicated by the dotted line of FIG. 5, the gear 32 is not engaged with the gear 34, and the driving force of the first driving source 25 is not transmitted to the separation rollers 15. This state is referred to as the "non-separation state" in which the paper sheet P is not separated. In the non-separation state, the separation rollers 15 is brought into a state in which the separation rollers 15 can freely rotate with a small force.

Further, in the present embodiment, in the switching between the "separation state" and the "non-separation state" by the separation switching unit 27, movement of the first moving gear 33 in the X axis direction can be performed by operating a not-illustrated electromagnetic clutch and the like controlled by the controller 19, in addition to a case where the movement of the first moving gear 33 in the X axis direction is performed manually. Further, it is possible to switch the separation switching unit 27 either manually or automatically.

When the controller 19 controls the switching between the "separation state" and the "non-separation state" by the separation switching unit 27, the controller 19, for example, determines whether the feeding is performed in the separation mode or the non-separation mode, based on the type of the paper sheet P set by the operation panel 7.

The non-separation mode is, for example, selected when a paper sheet (as an example, a paper sheet of which a surface is constituted by a plurality of layers like an instant photograph and in which the layers are easily peeled off) damaged when the separation is performed by the separation rollers 15 or a booklet such as a passbook and a passport is fed.

Various paper sheets P can be properly fed by selecting whether the feeding is performed in the separation mode or the non-separation mode depending on the type of the paper sheet P.

Further, whether the feeding is performed in the separation mode or the non-separation mode can be determined by a user himself/herself, and the switching between the "separation state" and the "non-separation state" can be manually performed by the separation switching unit 27. In this case, it is preferable that a sensor and the like that detects whether the separation switching unit 27 is set in the separation mode or the non-separation mode be provided, and the controller 19 can identify in which state the separation switching unit 27 currently exists.

Alternatively, the user can select the separation mode or the non-separation mode by using the operation panel 7, and the switching between the "separation state" and the "non-separation state" can be performed by the controller 19.

Further, when the feeding is performed in the separation mode, the medium feeding apparatus 10 can change the separation setting according to the conditions during the feeding, which have been described above. The conditions during the feeding mean at least one of all the conditions affecting separability, such as the type of the paper sheet and the number of paper sheets placed on the medium placing unit 11, or a combination of the plurality thereof.

The separation setting of the separation mode includes a pressing load of the separation rollers 15 against the feeding rollers 14, a rotational speed of the separation rollers 15, and the limit torque of the separation rollers 15.

In this case, all of the pressing load, the rotational speed, and the limit torque may be selected as a change target, both the pressing load and the limit torque may be selected as the change target, both the rotational speed and the limit torque may be selected as the change target, and both the pressing load and the rotational speed may be selected as the change target.

Hereinafter, detailed separation setting in the separation mode will be described. Further, after a specific example of the separation setting is described, the torque changing unit 40 and the load changing unit 60 among various changing units for changing the separation setting will be described.

Separation Setting in Separation Mode
Separation Setting W1

Separation setting W1 is setting that is changed according to a difference in the thickness of the paper sheet among the conditions during the feeding.

In the separation setting W1, in the medium feeding apparatus 10, when a second paper sheet (a second medium) having a relatively smaller thickness than a first paper sheet (a first medium) is separated, at least one of the pressing load of the separation rollers 15, the rotational speed of the separation rollers 15, and the limit torque of the separation rollers 15 are suppressed as compared to a case where the first paper sheet is separated.

That is, when the second paper sheet, which is thin in a relative sense (hereinafter, simply referred to as thin), is separated, at least one of reducing of the pressing load of the separation rollers 15, reducing of the rotational speed of the separation rollers 15, and reducing of the limit torque is performed, as compared to a case where the first paper sheet, which is relatively thicker than the second paper sheet (hereinafter, simply referred to as thick), is separated. Further, examples of the first paper sheet include plain paper sheets having a regular size, such as A4, A3, B5, and B4.

As separation resistance between the separation rollers 15 and the feeding rollers 14 is increased to some extent, the paper sheet can be surely separated by the separation rollers 15. The "separation resistance" mentioned herein is determined based on the pressing load of the separation rollers 15, the rotational speed of the separation rollers 15, the limit torque of the separation rollers 15, and a combination thereof. For example, the separation resistance increases when the pressing load of the separation rollers 15 increases, the separation resistance increases when the rotational speed of the separation rollers 15 increases, and the separation resistance increases when the limit torque of the separation rollers 15 increases.

However, the thin second paper sheet tends to have low rigidity. When the separation resistance increases, there is a concern in that the second paper sheet is broken or wrinkled.

When the second paper sheet (thin) is separated, as at least one of the pressing load of the separation rollers 15, the rotational speed of the separation rollers 15, and the limit torque of the separation rollers 15 is suppressed as compared to a case where the first paper sheet (thin) is separated, the separation resistance when the second paper sheet (thick) is separated can be reduced as compared to a case where the first paper sheet (thick) is separated. Therefore, it is possible to reduce a risk of damage such as tearing and wrinkling of the thin second paper sheet, caused by the separation by the separation rollers 15.

Further, when the second paper sheet is separated, all of the pressing load, the rotational speed, and the limit torque may be reduced or one or two thereof may be selectively suppressed, as compared to a case where the first paper sheet is separated.

Separation Setting W2

Next, separation setting W2 is setting that is changed according to a difference in the frictional force of the paper sheet among the conditions during the feeding. The frictional force of the paper sheet mentioned herein is synonymous with a frictional force between paper sheets.

In the separation setting W2, in the medium feeding apparatus 10, when the second paper sheet (the second medium) having a relatively larger frictional force than the first paper sheet (the first medium) is separated, at least one of the pressing load, the rotational speed, and the limit torque increases as compared to a case where the first paper sheet is separated.

That is, when the second paper sheet is separated, at least one of increasing of the pressing load of the separation rollers 15, increasing of the rotational speed of the separation rollers 15, and increasing of the limit torque is performed, as compared to a case where the first paper sheet is separated.

When a paper sheet having a high frictional force is separated, if the separation resistance between the separation rollers 15 and the feeding rollers 14, there is a concern in that the separation cannot be performed, the feeding by the feeding rollers 14 is not performed, and a non-feeding state is obtained. Examples of the paper sheet having a high frictional force include a photographic paper sheet having a coating layer on a printing surface thereof. In contrast, the plain paper sheet not having the coating layer has relatively low frictional force.

Here, when the second paper sheet having a relatively high frictional force (hereinafter, referred to as high friction) rather than the first paper sheet having a relatively low frictional force (hereinafter, referred to as low friction) is separated, at least one of the pressing load, the rotational speed, and the limit torque increases as compared to a case where the first paper sheet (the low friction) is separated. Thus, when the second paper sheet having the high friction is separated, the separation resistance by the separation rollers 15 can increase as compared to a case where the first paper sheet having the low friction is separated, and thus separation performance can be improved. Therefore, the second paper sheet having a high frictional force, that is, a paper sheet that is difficult to separate, can be separated more certainly.

Even in this case, when the second paper sheet is separated, all of the pressing load, the rotational speed, and the limit torque may increase or one or two thereof may selectively increase, as compared to a case where the first paper sheet is separated.

Separation Setting W3

Next, separation setting W3 is setting that is changed according to a difference in the thickness of the paper sheet among the conditions during the feeding.

In the separation setting W3, in the medium feeding apparatus 10, when the second paper sheet (the second medium) having a relatively larger thickness than the first paper sheet (the first medium) is separated, the pressing load of the separation rollers 15 increases as compared to a case where the first paper sheet is separated.

That is, when the second paper sheet that is thick in a relative sense (hereinafter, simply referred to as thick) is separated, the pressing load of the separation rollers 15 increases, as compared to a case where the first paper sheet that is relatively thinner than the second paper sheet (hereinafter, simply referred to as thin) is separated.

When the thickness of the fed paper sheet is thick, it is difficult for the paper sheet to enter a gap between the separation rollers 15 and the feeding rollers 14, the paper sheet is not fed by the feeding rollers 14, and a non-feeding state is obtained.

Therefore, when the second paper sheet having a relatively larger thickness than the first paper sheet is separated, the pressing load of the separation rollers 15 increases as compared to a case where the first paper sheet (thin) is separated. Thus, the second paper sheet can be firmly nipped between the separation rollers 15 and the feeding rollers 14. Thus, feedability by the feeding rollers 14 can be improved. Accordingly, it is possible to reduce a possibility that the second paper sheet having a large thickness is not fed.

As described above, at least one of the pressing load of the separation rollers 15, the rotational speed of the separation rollers 15, and the limit torque can be changed according to the conditions during the feeding, and different separation settings are configured, so that more types of paper sheets can be separated properly.

A case where the paper sheet is separated and fed in the separation mode will be described with reference to FIG. 8.

After the separation mode starts, the separation setting is selected according to the conditions during the paper sheet feeding (step S1). When the separation setting W1 (the separated paper sheet is the second paper sheet that is relatively thinner than the first paper sheet) is selected, any one of the pressing load, the rotational speed, and the limit torque is suppressed as compared to a case where the first paper sheet is separated (step S2).

When the separation setting W2 (the separated paper sheet is the second paper sheet having a frictional force that is relatively higher than the first paper sheet) is selected, any one of the pressing load, the rotational speed, and the limit torque increases as compared to a case where the first paper sheet is separated (step S3).

When the separation setting W3 (the separated paper sheet is the second paper sheet that is relatively thicker than the first paper sheet) is selected, the pressing load increases as compared to a case where the first paper sheet is separated (step S4).

When any one of the pressing load, the rotational speed, and the limit torque is changed according to each separation setting, the paper sheet (the second paper sheet) is fed while the separation is performed by the separation rollers 15.

It is possible to set a setting other than the separation setting W1 to the separation setting W3 as a separation setting according to the conditions during the paper sheet feeding.

In the separation setting of the separation rollers 15 according to the conditions during the feeding, for example, as the user inputs the type of the paper sheet P to the scanner 1 using the operation panel 7, the controller 19 can automatically select the type.

Further, the controller 19 includes a mode in which the separation is performed in a predetermined separation setting (for example, the separation settings W1 to W3). As the user determines a separation setting according to the type of the paper sheet P and inputs the type using the operation panel 7, the controller 19 can receive an instruction indicating in which separation setting among the separation settings W1 to W3 the separated is performed.

Further, for example, the second detection unit 22 and the double feeding detecting unit 28 (see FIG. 3 for both) detect the paper sheet P between the feeding rollers 14 and the transport roller pair 16, the controller 19 can determine a separation setting for a following paper sheet P2 fed next to a leading paper sheet P1 previously fed, based on a result obtained by detecting the leading paper sheet P1.

For example, after the feeding by the feeding rollers 14 starts, after a predetermined time elapses, or after the feeding rollers 14 are driven by a predetermined amount, when the second detection unit 22 (FIG. 3) does not detect the leading paper sheet P1, it is considered that non-feeding of the leading paper sheet P1 occurs. In such a case, the controller 19 executes a separation mode of the separation setting W3, which has been described above, with respect to the leading paper sheet P1 and the following paper sheet P2 to be fed again.

Further, when the leading paper sheet P1 is fed, if the double feeding is detected by the double feeding detecting unit 28 (FIG. 3), it is considered that the leading paper sheet P1 and the following paper sheet P2 double-fed together with the leading paper sheet P1 are media having high frictional forces. In such a case, the controller 19 executes a separation mode of the separation setting W2, which has been described above, with respect to the leading paper sheet P1 and the following paper sheet P2 to be fed again.

Accordingly, the conditions of the separation setting of the separation mode in which an error occurs in advance are fed back, so that the controller 19 can determine the separation setting of the separation mode to be performed next.

Another Configuration of Separation Rollers

The separation rollers 15 may be rotationally driven by the first driving source 25 in the first rotation direction A (FIG. 3). The first rotation direction A is a rotation direction in which the separation rollers 15 feed the paper sheet P to the downstream side (the +Y direction side).

Here, for example, when the number of the paper sheets P placed on the medium placing unit 11 is large, if a leading end of the paper sheet P is aligned in the Y direction as illustrated in an upper diagram of FIG. 6, the leading end of the paper sheet P is difficult to enter a gap between the separation rollers 15 and the feeding rollers 14, and non-feeding may occur.

Further, in a state illustrated in the upper diagram of FIG. 6, when the separation rollers 15 rotate in the second rotation direction B corresponding to a direction in which the separation rollers 15 separate the paper sheet, an upper paper sheet among the stacked paper sheets P may be rolled up.

Here, in the present embodiment, after the feeding by the feeding rollers 14 starts and before the separation mode is executed, the controller 19 rotationally drives the separation rollers 15 in the first rotation direction A by a predetermined rotation amount. Further, while the separation rollers 15 rotate in the first rotation direction A, the feeding rollers 14 are also driven.

As illustrated in the upper diagram of FIG. 6, from a state in which leading ends of the plurality of paper sheets P are aligned in the Y direction, when the separation rollers 15 rotate in the first rotation direction A while the feeding rollers 14 rotate in the feeding direction, the leading ends of the plurality of paper sheets P are misaligned and handled, as illustrated in a middle diagram of FIG. 6.

From this state, when the feeding rollers 14 are kept rotating in the feeding direction and the separation rollers 15 rotate in the second rotation direction B, as illustrated in a lower diagram of FIG. 6, the leading ends of the paper sheets P on a lowermost side (closest to the medium placing unit 11) are easy to enter a gap between the separation rollers 15 and the feeding rollers 14, and it is possible to certainly nip the paper sheets P between the separation rollers 15 and the feeding rollers 14. Therefore, it is possible to reduce a possibility that defects such as the non-feeding and rolling-up of the paper sheet occur.

Further, an operation in which the separation rollers 15 is rotationally driven in the first rotation direction A before the separation mode is executed does not need to be performed when the separation mode is performed. For example, a number detecting unit of the paper sheets P placed on the medium placing unit 11 is provided, and the operation may be executed only when it is detected that the predetermined number or more of the paper sheets P are placed on the medium placing unit 11.

Next, the torque changing unit 40 that changes the limit torque of the separation rollers 15 and the load changing unit 60 that changes the pressing load of the separation rollers 15 will be described. Further, as described above, the rotational speed of the separation rollers 15 is changed as the controller 19 as the "speed changing unit" controls driving of the first driving source 25 (FIG. 4) that drives the separation rollers 15.

In Torque Changing Unit

Hereinafter, the torque changing unit 40 that changes the limit torque of the torque limiter 41 will be described with reference to FIGS. 5 and 7.

As illustrated in FIGS. 5 and 7, the torque limiter 41 includes a first torque limiter 42 and a second torque limiter 43. In the present embodiment, performances (idle torques) of the first torque limiter 42 and the second torque limiter 43 are the same. Each idle torque is set as T1.

A tooth of a gear is formed on an outer periphery of each of the first torque limiter 42 and the second torque limiter 43, and constitutes a part of the first wheel train 31 of the power transmission mechanism 30.

In other words, the first torque limiter 42 and the second torque limiter 43 are provided in the gears included in the power transmission mechanism 30 illustrated in FIG. 5.

Thus, the torque changing unit 40 includes a switching unit 46 that performs switching between a state (an upper diagram of FIG. 7) in which the rotational torque is applied to one of the first torque limiter 42 and the second torque limiter 43 and a state (a lower diagram of FIG. 7) in which the rotational torque is applied to both the first torque limiter 42 and the second torque limiter 43.

In more detail, the second moving gear 36 included in the power transmission mechanism 30 illustrated in FIG. 5 constitutes the switching unit 46.

The second moving gear 36 is slidable in a machine width direction, that is, in the X axis direction. FIG. 5 illustrates a state indicated by a solid line in which the second moving gear 36 is located on the −X direction side and a state indicated by a dotted line in which the second moving gear 36 is located in the +X direction.

Thus, when the second moving gear 36 is located on the −X direction side (the solid line in FIG. 5), the second moving gear 36 is brought into a state (the upper diagram of FIG. 7) of being engaged with only the second torque limiter 43 among the first torque limiter 42 and the second torque limiter 43 as the torque limiter 41, and is brought into a state of applying the rotational torque to one side (the first torque limiter 42).

In this state, a limit torque T of the separation rollers 15 includes only an idle torque T1 of the second torque limiter 43 and does not include an idle torque T1 of the first torque limiter 42.

Further, when the second moving gear 36 is located on the +X direction side (the dotted line in FIG. 5), the second moving gear 36 is brought into a state (the lower diagram of FIG. 7) of being engaged with both the first torque limiter 42 and the second torque limiter 43, and is brought into a state of applying the rotational torque to both the first torque limiter 42 and the second torque limiter 43.

In this state, the limit torque T of the separation rollers 15 includes both the idle torque T1 of the first torque limiter 42 and the idle torque T1 of the second torque limiter 43.

The limit torque T of the separation rollers 15 can be changed according to the above-described configuration of the torque changing unit 40.

In the present embodiment, as illustrated in FIG. 7, the second moving gear 36 as the switching unit 46 is rotatably held by the gear holder 44. A knob portion 45 is provided in the gear holder 44, and the knob portion 45 is exposed from the upper unit 4, as illustrated in FIGS. 1 and 2. The user can slide the knob portion 45 in the X axis direction to easily change the limit torque of the separation rollers 15.

Further, movement of the second moving gear 36 as the switching unit 46 in the X direction, that is, the switching of the limit torque, may be manually performed as described above. Otherwise, the movement of the second moving gear 36 in the X direction may be performed by an electromagnetic clutch, or the like, or may be controlled by the controller 19.

Further, in the present embodiment, the idle torque of the first torque limiter 42 and the idle torque of the second torque limiter 43 may be identically named T1 or may be named different torques (T1 and T2).

In this case, when configured as follows, a range of a change in the limit torque of the separation rollers 15 increases.

That is, the torque changing unit 40 includes the first torque limiter 42 for the idle torque T1 and the second torque limiter 43 for the idle torque T2 that is different from the idle torque of the first torque limiter 42, and performs switching between a state in which the second moving gear 36 as the switching unit 46 is engaged only with the second torque limiter 43 (the upper diagram of FIG. 7) to apply the rotational torque to the second torque limiter 43 and a state in which the second moving gear 36 as the switching unit 46 is engaged only with the first torque limiter 42 (not illustrated) to apply the rotational torque to the first torque limiter 42.

In other words, the torque changing unit 40 includes a switching unit 46 that performs switching between a state in which the rotational torque is applied to the first torque limiter 42 and a state in which the rotational torque is applied to the second torque limiter 43.

As configured above, the limit torque T of the separation rollers 15 can be easily changed between a state in which only T1 is included and a state in which only T2 is included. Further, as mentioned above, if the second moving gear 36 is engaged with both the first torque limiter 42 and the second torque limiter 43 (the lower diagram of FIG. 7), the rotational torque can be brought into a state of being applied to both the first torque limiter 42 and the second torque limiter 43, and both T1 and T2 can be brought into a state of being included in the limit torque T of the separation rollers 15.

In Load Changing Unit

Hereinafter, the load changing unit 60 that changes the pressing load of the separation rollers 15 will be described with reference to FIG. 9.

The load changing unit 60 is disposed between a spring support 61 and the separation rollers 15, includes a pressing spring 62 that presses the separation rollers 15 against the feeding rollers 14, changes a spring length L of the pressing spring 62 by moving the spring support 61, and changes the pressing load of the separation rollers 15 against the feeding rollers 14.

In more detail, the separation rollers 15 are rotatably supported on a roller holding unit 63, and the pressing spring 62 is in contact with the roller holding unit 63. That is, the pressing spring 62 presses the separation rollers 15 toward the feeding rollers 14 through the roller holding unit 63.

The roller holding unit 63 has a swinging shaft 64 which swings such that the held separation rollers 15 come into contact with or are separated from the feeding rollers 14.

An eccentric cam 65 is provided on the spring support 61, and the eccentric cam 65 rotates about a rotary shaft 66, so that the spring support 61 moves in the Z axis direction.

When an outer peripheral portion 65a of the eccentric cam 65 closest to the rotary shaft 66 comes into contact with the spring support 61 (a left side of FIG. 9), the spring support 61 extends the longest in the +Z direction. Thus, the spring length L of the pressing spring 62 is L1 which is longest. At this time, the pressing load K is a pressing load K1 which is smallest.

Meanwhile, when the outer peripheral portion 65b of the eccentric cam 65 farthest from the rotary shaft 66 comes into contact with the spring support 61 (a right side of FIG. 9), the spring support 61 extends the longest in the −Z direction. Thus, the spring length L of the pressing spring 62 is L2 which is shortest. At this time, the pressing load K is a pressing load K2 which is largest.

As the eccentric cam 65 rotates, the pressing load K can be changed to a value between the pressing load K1 and the pressing load K2.

The eccentric cam 65 rotates by receiving power from a not-illustrated driving source, and the controller 19 controls rotation of the driving source (not illustrated) to control the rotation of the eccentric cam 65.

In other words, the controller 19 that controls the rotational speed of the separation rollers 15 controls at least one of the load changing unit 60 and the torque changing unit 40 (in the present embodiment, the load changing unit 60).

Accordingly, the rotational speed of the separation rollers 15 and the pressing load of the separation rollers 15 can be automatically changed.

In the present embodiment, the limit torque T is changed by manually operating the torque changing unit 40 by the user. However, the controller 19 can also control the operation of the torque changing unit 40. Thus, when the separation mode is performed, the separation setting can be automatically changed according to the conditions during the feeding.

In Another Example of Torque Changing Unit

Modification Example 1 of Torque Changing Unit

Hereinafter, a torque changing unit 50 which is a modification of the torque changing unit will be described with reference to mainly FIGS. 10 and 11.

The torque changing unit 50 illustrated in FIGS. 10 and 11 includes a torque limiter 51 that causes the separation rollers 15 to idle in the first rotation direction A when the rotational torque applied to the separation rollers 15 in the first rotation direction A (FIG. 3) exceeds a predetermined limit torque, and a power transmission mechanism 52 between the separation rollers 15. The power transmission mechanism 52 includes a first power transmission path 53 (a left side of FIG. 11), a second power transmission path 54 (a right side of FIG. 11) having a reduction ratio that is different from a reduction ratio of the first power transmission path 53, and a moving gear 55 as a "switching unit" that performs switching between the first power transmission path 53 and the second power transmission path 54.

Hereinafter, a configuration of the torque changing unit 50 will be described in more detail.

The torque limiter 51 is provided in a gear 70. The power of the first driving source 25 (FIG. 4) is transmitted to a shaft 51*a* of the torque limiter 51 through a power transmission mechanism such as a not-illustrated wheel train.

As illustrated in FIG. 10, the power transmission mechanism 52 having the torque limiter 51 provided therein and extending from the gear 70 to the separation rollers 15 includes a moving gear 55, a first gear 56, a second gear 57, a third gear 58, a fourth gear 59 (see FIG. 11), a rotary shaft 71 having the fourth gear 59 provided therein, and a wheel train 72 provided between the rotary shaft 71 and a rotary shaft 15*a* of the separation rollers 15.

The moving gear 55 is movable in the X axis direction, and is switched between a first state of being engaged with the first gear 56 as illustrated in a left diagram of FIG. 11 and a second state of engaged with the third gear 58 as illustrated in a right diagram of FIG. 11.

A reduction ratio when the moving gear 55 is engaged with the first gear 56 (a reduction ratio when the power is transmitted in an order of the moving gear 55, the first gear 56, the second gear 57, the third gear 58, and the fourth gear 59) and a reduction ratio when the moving gear 55 is engaged with the third gear 58 (a reduction ratio when the power is transmitted in an order of the moving gear 55, the third gear 58, and the fourth gear 59) are different from each other.

In more detail, in a first state (a left diagram of FIG. 11), power (rotation) of the gear 70 is transmitted in an order of the moving gear 55, the first gear 56, the second gear 57, the third gear 58, the fourth gear 59, the rotary shaft 71, the wheel train 72, the rotary shaft 15*a*, and the separation rollers 15. This power transmission path is the first power transmission path 53.

In a second state (a right diagram of FIG. 11), power (rotation) of the gear 70 is transmitted in an order of the moving gear 55, the third gear 58, the fourth gear 59, the rotary shaft 71, the wheel train 72, the rotary shaft 15*a*, and the separation rollers 15. This power transmission path is the second power transmission path 54.

The reduction ratios of the first power transmission path 53 (the left diagram of FIG. 11) and the second power transmission path 54 (the right diagram of FIG. 11) are different from each other (are configured above). Accordingly, the limit torque T1 of the separation rollers 15 when the power is transmitted along the first power transmission path 53 and the limit torque T2 of the separation rollers 15 when the power is transmitted along the second power transmission path 54 are different from each other.

Thus, as the moving gear 55 as the "switching unit" is moved in the X axis direction and the switching between the first power transmission path 53 (the left diagram of FIG. 11) and the second power transmission path 54 (the right diagram of FIG. 11) is performed, the limit torque of the separation rollers 15 can be switched from T1 to T2 or from T2 to T1.

Next, the switching between the first power transmission path 53 and the second power transmission path 54, which is performed by moving the moving gear 55 in the X-axis direction, may be manually performed or may be automatically performed under a control of the controller 19.

Modification Example 2 of Torque Changing Unit

Hereinafter, a torque changing unit 80 which is a modification of the torque changing unit will be described with reference to mainly FIGS. 12 and 13.

The torque changing unit 80 illustrated in FIG. 12 includes a gear 81 provided coaxially with the rotary shaft 15*a* of the separation rollers 15 and a torque limiter 83. Thus, the torque limiter 83 is configured such that performance (an idle torque) is switched when the gear 81 is normally rotated and when the gear 81 is reversely rotated. As illustrated in FIG. 13, the torque limiter 83 has a coil spring 87 provided therein.

Hereinafter, a configuration of the torque changing unit 80 will be described in more detail.

An upper diagram of FIG. 12 and an upper diagram of FIG. 13 illustrate a state in which the gear 81 is rotated along arrow C. Further, a lower diagram of FIG. 12 and a lower diagram of FIG. 13 illustrate a state in which the gear 81 is rotated along arrow D.

When the gear 81 is rotated along arrow C (the upper diagram of FIG. 12 and the upper diagram of FIG. 13), the torque changing unit 80 is in a first state in which a body 86 of the torque limiter 83 and a connection portion 84 on the rotary shaft 15*a* side of the separation rollers 15 are connected to each other and a shaft 82 of the torque limiter 83 and a connection portion 85 on the gear 81 side are connected to each other.

Further, when the gear 81 is rotated along arrow D (the lower diagram of FIG. 12 and the lower diagram of FIG. 13), the torque changing unit 80 is in a second state in which the body 86 of the torque limiter 83 and a connection portion 85 on the gear 81 side are connected to each other and the shaft 82 of the torque limiter 83 and the connection portion 84 on the rotary shaft 15*a* side of the separation rollers 15 are connected to each other.

Thus, as switching between the first state and the second state is performed, the diameter of the coil spring 87 of the torque limiter 83 is changed.

When the diameter of the coil spring 87 is changed, a frictional force between the coil spring 87 and the body 86 is changed, and thus performance (an idle torque) of the torque limiter 83 can be changed.

In Another Example of Load Changing Unit

Modification Example 1 of Load Changing Unit

A load changing unit 90 which is a modification of the load changing unit will be described with reference to FIG. 14.

The load changing unit 90 includes a first coil spring 91 as a "first pressing unit" and a second coil spring 92 as a "second pressing unit" having a pressing force that is different from the first coil spring 91. A spring (a pressing unit) that presses the separation rollers 15 to the feeding rollers 14 is switched between the first coil spring 91 and a second coil spring 92, so that the pressing load K of the separation rollers 15 against the feeding rollers 14 is changed. The first coil spring 91 and the second coil spring 92 are springs having different spring coefficients.

The first coil spring 91 and the second coil spring 92 are in contact with the roller holding unit 63 holding the separation rollers 15 to press the separation rollers 15 through the roller holding unit 63.

An upper diagram of FIG. 14 illustrates a state in which the first coil spring 91 is in contact with the roller holding unit 63 to press the separation rollers 15. A lower diagram of FIG. 14 illustrates a state in which the second coil spring 92 is in contact with the roller holding unit 63 to press the separation rollers 15.

The spring that presses the separation rollers 15 can be switched using, for example, a rack and pinion mechanism 93. For example, in FIG. 14, when a pinion 94 is rotated along arrow E, the first coil spring 91 is lowered, and the second coil spring 92 is raised. In contrast, when the pinion 94 is rotated along arrow F, the first coil spring 91 is raised, and the second coil spring 92 is lowered.

The pressing load K when the separation rollers 15 are pressed by the first coil spring 91 is K1, and the pressing load K when the separation rollers 15 are pressed by the second coil spring 92 is K2.

The pressing load K of the separation rollers 15 against the feeding rollers 14 can be changed between the pressing load K1 and the pressing load K2 even by the above-described load changing unit 90.

Modification Example 2 of Load Changing Unit

A load changing unit 100 which is a modification of the load changing unit will be described with reference to FIG. 15.

The medium feeding apparatus 10 includes a roller holding unit 101 that holds the separation rollers 15 in a rotatable state and has a swinging shaft 102 swinging such that the held separation rollers 15 come into contact with and are separated from the feeding rollers 14, and a pressing spring 103 as a "pressing unit" that presses the separation rollers 15 against the feeding rollers 14 through the roller holding unit 101.

Thus, the load changing unit 100 moves a position of the swinging shaft 102 to change the pressing load K of the separation rollers 15 against the feeding rollers 14.

The swinging shaft 102 can be displaced between a position α illustrated in a left diagram of FIG. 15 and a position β illustrated in a right diagram of FIG. 15.

When the position of the swinging shaft 102 is changed, an angle θ between a tangent line of a nip position N between the separation rollers 15 and the feeding rollers 14 and a line segment connecting a center of the swinging shaft 102 and the nip position N is changed.

A pressing force by the pressing spring 103 is decomposed into arrow a, arrow b, and arrow c with respect to the angle θ. As the angle θ becomes smaller, the pressing load K (arrow c) against the feeding rollers 14 at the nip position N becomes larger.

The angle θ when the swinging shaft 102 is located in the position α illustrated in the left diagram of FIG. 15 is defined as θ1, and the pressing load K at this time is defined as K1. Further, the angle θ when the swinging shaft 102 is located in the position β illustrated in the right diagram of FIG. 15 is defined as θ2, and the pressing load K at this time is defined as K2.

In the angle θ, θ1<θ2 is satisfied. However, in the pressing load K, K1>K2 is satisfied.

The pressing load K of the separation rollers 15 against the feeding rollers 14 can be changed between the pressing load K1 and the pressing load K2 by the above-described load changing unit 100.

Modification Example 3 of Load Changing Unit

A load changing unit 110 which is a modification of the load changing unit will be described with reference to FIG. 16.

The medium feeding apparatus 10 includes a roller holding unit 111 that holds the separation rollers 15 in a rotatable state and has a swinging shaft 112 swinging such that the held separation rollers 15 come into contact with and are separated from the feeding rollers 14, and a pressing spring 113 as a "pressing unit" that presses the separation rollers 15 against the feeding rollers 14 through the roller holding unit 111.

Thus, the load changing unit 110 includes a displacement member 115 that is in contact with the roller holding unit 111 to regulate positions of the separation rollers 15 with respect to the feeding rollers 14 against a pressing force of the pressing spring 113 and is displaceable in a direction in which the positions of the separation rollers 15 with respect to the feeding rollers 14 are changed.

In FIG. 16, the displacement member 115 is displaced in a Z axis direction by a rack portion 116 provided integrally with the displacement member 115 and a pinion gear 117 engaged with the rack portion 116. When the pinion gear 117 is rotated along arrow G, the displacement member 115 is displaced to the upper side (in the +Z direction), and when the pinion gear 117 is rotated along arrow H, the displacement member 115 is displaced to the lower side (in the −Z direction).

The displacement member 115 is in contact with a contact portion 114 provided in the roller holding unit 111 from below, and regulates the positions of the separation rollers 15 with respect to the feeding rollers 14.

When the displacement member 115 is displaced to the upper side, that is, in a direction in which the displacement member 115 resists the pressing force of the pressing spring 113, the pressing load K of the separation rollers 15 against the feeding rollers 14 is reduced. When the displacement member 115 displaced to the upper side returns to the lower side, the pressing load K increases.

The pressing load K of the separation rollers 15 against the feeding rollers 14 can be easily changed by the above-described load changing unit 110.

Modification Example 4 of Load Changing Unit

A load changing unit 120 which is a modification of the load changing unit will be described with reference to FIG. 17.

A power transmission mechanism 30A that transmits power from the first driving source 25 (not illustrated in FIG. 17, see FIG. 4) that drives the separation rollers 15 is provided in the medium feeding apparatus 10.

The power transmission mechanism 30A includes a first gear 121 provided integrally with the rotary shaft 15a of the separation rollers 15, a second gear 122 provided integrally with the rotary shaft 15a of the separation rollers 15 and having a reduction ratio that is different from a reduction ratio of the first gear 121, and a switching gear 125 displaceable between a first position M1 (a left diagram of FIG. 17) where the power of the first driving source 25 is transmitted to the first gear 121 and a second position M2 (a right diagram of FIG. 17) where the power of the first driving source 25 is transmitted to the second gear 122.

As an example, a reduction ratio R1 of the first gear 121 is set to be relatively lower than a reduction ratio R2 of the second gear 122 (R1<R2).

Further, a power transmission mechanism not illustrated in FIG. 17 and extending from the first driving source 25 to the switching gear 125 can be configured using a wheel train including a plurality of gears or a belt mechanism.

Thus, the load changing unit 120 switches the switching gear 125 between the first position M1 (the left diagram of FIG. 17) and the second position M2 (the right diagram of FIG. 17), to change the pressing load K of the separation rollers 15 against the feeding rollers 14.

When the power from the first driving source 25 is transmitted to the separation rollers 15 by the power transmission mechanism 30A and the separation rollers 15 are rotated in the second rotation direction B, as a reduction ratio of the gear provided integrally with the rotary shaft 15*a* of the separation rollers 15 becomes higher, a lifting force (a force applied in a direction in which the separation rollers 15 are separated from the feeding rollers 14) applied to the separation rollers 15 tends to be increased by driving of the separation rollers 15. When the lifting force becomes larger, the pressing load of the separation rollers 15 is reduced.

Therefore, the pressing load K2 in a state of the right diagram of FIG. 17 in which the switching gear 125 is disposed in the second position M2 and the power is transmitted to the rotary shaft 15*a* through the second gear 122 having the high reduction ratio R2 is smaller than the pressing load K1 in a state of the left diagram of FIG. 17 in which the switching gear 125 is disposed in the first position M1 and the power is transmitted to the rotary shaft 15*a* through the first gear 121 having the lower reduction ratio R1 (K1>K2).

In such a load changing unit 120, a position of the switching gear 125 is switched between the first position M1 and the second position M2, so that the pressing load K of the separation rollers 15 against the feeding rollers 14 can be changed between the pressing load K1 and the pressing load K2.

Further, in the controller 19, when feeding control (including the above-described separation settings) is switched according to the type of the paper sheet, in selection of the type of the paper sheet by the user, that is, selection of the feeding control, a user interface (UI) may be developed on a display unit of the operation panel 7 and the type may be selected by the user through the corresponding UI, or a hard switch that selects the type of the paper sheet may be provided on a front apparatus surface on which the operation panel 7 is provided. This hard switch can, for example, be disposed together with a power button. Such a hard switch is provided, so that the user can directly select the type of the paper sheet without opening a menu screen or the like. Further, the hard switch may be set to function as a scanning execution button in addition to the selection of the type of the paper sheet.

In detail, four types of paper sheets such as a "document", an "ordinary photograph", a "panoramic photograph", and an "instant photograph" can be selected. In this case, the hard switch is provided in each paper sheet type, and a total of four hard switches (switches for selecting the types of the paper sheets) are provided on the front apparatus surface. Further, the instant photograph is a photograph including a plurality of layers, such as Polaroid (a trade mark of the Polaroid Cooperation), and is a photograph that may be damaged as the layers are separated from each other when the separation rollers 15 are separated in a separation state. Therefore, it is preferable that in the case of the instant photograph, the "non-separation state" in which the above-described separation switching unit 27 (FIG. 5) is separated be set as the feeding control, and in the case of the other paper sheet types, the above-described "separation state" be set as the feeding control.

Thus, when the separation setting corresponding to each hard switch according to the type of the paper sheet, appropriate separation can be performed. Further, since the feeding control includes not only the separation settings but also the double feeding detection using the double feeding detecting unit 28 (FIG. 3), jam detection, and the like, when these settings are switched to an appropriate one according to the paper sheet type, more appropriate transporting can be realized.

In addition, the invention is not limited to the above-described embodiments, and it is apparent that various modifications can be derived within the scope of the invention described in the appended claims, and are included in the scope of the invention.

For example, the above-described medium feeding apparatus 10 can be mounted not only on the image reading apparatus but also on other apparatuses. As an example, the medium feeding apparatus 10 may be provided in a recording apparatus that performs recording on the transported paper sheet (the medium).

The entire disclosure of Japanese Patent Application No. 2017-248839, filed Dec. 26, 2017 and No. 2018-181433, filed Sep. 27, 2018 are expressly incorporated by reference herein.

What is claimed is:

1. A medium feeding apparatus comprising:
a medium placing unit on which a medium is placed;
a feeding roller that feeds the medium from the medium placing unit;
a separation roller which nips the medium between the separation roller and the feeding roller to separate the medium and to which a driving torque is applied by a driving source in a second rotation direction that is opposite to a first rotation direction in which the medium is fed to a downstream side;
a torque limiter that causes the separation roller to idle in the first rotation direction when a rotational torque applied to the separation roller in the first rotation direction exceeds a limit torque that is a predetermined upper torque limit;
a torque changing unit that changes the limit torque; and
a speed changing unit that changes a rotational speed of the driving source,
wherein separation setting including the rotational speed and the limit torque is changeable according to condition of feeding, and
the separation roller is configured to switch between a separation state of performing separation of the medium by being connected to the driving source through the torque limiter, and a non-separation state of not performing separation of medium with the torque limiter being disconnected from the driving source.

2. An image reading apparatus comprising:
a reading unit that reads a medium; and
the medium feeding apparatus according to claim 1, which feeds the medium to the reading unit.

3. A medium feeding apparatus comprising:
a medium placing unit on which a medium is placed;
a feeding roller that feeds the medium from the medium placing unit;
a separation roller which nips the medium between the separation roller and the feeding roller to separate the medium and to which a driving torque is applied by a driving source in a second rotation direction that is opposite to a first rotation direction in which the medium is fed to a downstream side;
a torque limiter that causes the separation roller to idle in the first rotation direction when a rotational torque applied to the separation roller in the first rotation direction exceeds a limit torque that is a predetermined upper torque limit;
a load changing unit that changes a pressing load of the separation roller against the feeding roller;
a speed changing unit that changes a rotational speed of the driving source; and
a torque changing unit that changes the limit torque;

wherein separation setting including the pressing load, the rotational speed, and the limit torque is changeable according to condition of feeding, and the separation roller is configured to switch between a separation state of performing separation of the medium by being connected to the driving source through the torque limiter, and a non-separation state of not performing separation of medium with the torque limiter being disconnected from the driving source.

4. The medium feeding apparatus according to claim 3, wherein the load changing unit has a first pressing unit and a second pressing unit having a pressing force that is different from a pressing force of the first pressing unit, and wherein a pressing unit that presses the separation roller against the feeding roller is switched between the first pressing unit and the second pressing unit to change the pressing load.

5. The medium feeding apparatus according to claim 3, wherein the load changing unit includes a pressing spring disposed between a spring support and the separation roller to press the separation roller against the feeding roller, and changes a spring length of the pressing spring by moving the spring support to change the pressing load.

6. The medium feeding apparatus according to claim 3, further comprising:
a roller holding unit that holds the separation roller in a rotatable state and has a swinging shaft that swings the held separation roller to come into contact with or be separated from the feeding roller; and
a pressing unit that presses the separation roller against the feeding roller through the roller holding unit,
wherein the load changing unit changes the pressing load by moving a position of the swinging shaft.

7. The medium feeding apparatus according to claim 3, further comprising:
a roller holding unit that holds the separation roller in a rotatable state and has a swinging shaft that swings the held separation roller to come into contact with or be separated from the feeding roller; and
a pressing unit that presses the separation roller against the feeding roller through the roller holding unit,
wherein the load changing unit includes a displacement member that is in contact with the roller holding unit to regulate a position of the separation roller with respect to the feeding roller against a pressing force of the pressing unit and is displaceable in a direction in which the position of the separation roller with respect to the feeding roller is changed.

8. The medium feeding apparatus according to claim 3, further comprising:
a power transmission mechanism that transmits power from the driving source,
wherein the power transmission mechanism includes a first gear provided integrally with a rotary shaft of the separation roller, a second gear provided integrally with the rotary shaft of the separation roller and having a reduction ratio that is different from a reduction ratio of the first gear, and a switching gear displaceable between a first position where the power of the driving source is transmitted to the first gear and a second position where the power of the driving source is transmitted to the second gear, and
wherein the load changing unit switches the switching gear between the first position and the second position to change the pressing load.

9. The medium feeding apparatus according to claim 3, wherein the torque limiter includes a first torque limiter and a second torque limiter having an idle torque that is different from an idle torque of the first torque limiter, as the torque limiter, wherein the torque changing unit includes a switching unit that performs switching between a first torque state in which the rotational torque is applied to the first torque limiter and a second torque state in which the rotational torque is applied to the second torque limiter, wherein the switching unit includes a moving gear, the moving gear is slidable in a direction along which a rotary shaft of the separation roller extends, and wherein the moving gear is engaged only with the first torque limiter in the first torque state and is engaged only with the second torque limiter in the second torque state.

10. The medium feeding apparatus according to claim 3, wherein the torque limiter includes a first torque limiter and a second torque limiter as the torque limiter, wherein the torque changing unit includes a switching unit that performs switching between a first torque state in which the rotational torque is applied to one of the first torque limiter and the second torque limiter and a second torque state in which the rotational torque is applied to both the first torque limiter and the second torque limiter, wherein the switching unit includes a moving gear, the moving gear is slidable in a direction along which a rotary shaft of the separation roller extends, and wherein the moving gear is engaged with either the first torque limiter or the second torque limiter in the first torque state and is engaged with both the first torque limiter and the second torque limiter in the second torque state.

11. The medium feeding apparatus according to claim 3, further comprising:
a power transmission mechanism disposed between the torque limiter and the separation roller,
wherein the power transmission mechanism includes
a first power transmission path,
a second power transmission path that has a reduction ratio that is different from a reduction ratio of the first power transmission path, and
a switching unit that performs switching between the first power transmission path and the second power transmission path.

12. The medium feeding apparatus according to claim 3, further comprising:
a controller that serves as a speed changing unit for controlling the driving source.

13. The medium feeding apparatus according to claim 12, wherein the controller controls at least one of the load changing unit or the torque changing unit.

14. The medium feeding apparatus according to claim 12, wherein the controller is capable of selecting a separation mode of performing feeding in which the separation roller is in the separation state and a non-separation mode of performing feeding in which the separation roller is in the non-separation state, based on a kind of the fed medium.

15. The medium feeding apparatus according to claim 14, wherein the separation roller is rotationally driven by the driving source in the first rotation direction, and wherein the controller rotationally drives the separation roller in the first rotation direction by a predetermined rotation amount, before the separation mode is executed.

16. The medium feeding apparatus according to claim 3, wherein when a second medium having a thickness that is relatively thinner than a thickness of a first medium is separated, at least one of the pressing load, the rotational speed, or the limit torque is suppressed as compared to a case where the first medium is separated.

17. The medium feeding apparatus according to claim 3, wherein when a second medium having a frictional force that is relatively higher than a frictional force of a first medium is separated, at least one of the pressing load, the rotational speed, or the limit torque increases as compared to a case where the first medium is separated.

18. The medium feeding apparatus according to claim 3, wherein when a second medium having a thickness that is relatively thicker than a thickness of a first medium, the pressing load increases as compared to a case where the first medium is separated.

19. An image reading apparatus comprising:
a reading unit that reads a medium; and
the medium feeding apparatus according to claim 3, which feeds the medium to the reading unit.

* * * * *